(12) United States Patent
Powderly et al.

(10) Patent No.: US 7,287,099 B1
(45) Date of Patent: Oct. 23, 2007

(54) SYSTEM FOR SUPPORT OF REMOTE CONSOLE BY EMULATION OF LOCAL CONSOLE WITH MULTIPATH DATA FLOW STRUCTURE

(75) Inventors: Terrence V. Powderly, East Fallowfield, PA (US); Joseph H. End, III, Malvern, PA (US); Timothy C. Sell, Westminster, MD (US)

(73) Assignee: Unisys Corporation, Blue Bell, PA (US)

( * ) Notice: Subject to any disclaimer, the term of this patent is extended or adjusted under 35 U.S.C. 154(b) by 804 days.

(21) Appl. No.: 10/390,983

(22) Filed: Mar. 18, 2003

(51) Int. Cl.
*G06F 13/00* (2006.01)
*G06F 12/02* (2006.01)

(52) U.S. Cl. .............................. 710/7; 710/29; 710/30; 710/52; 713/1; 713/100; 345/537; 345/544; 463/16; 463/20

(58) Field of Classification Search .................... 710/7, 710/29, 30, 52; 463/16, 20; 345/537, 544; 713/1, 100
See application file for complete search history.

(56) References Cited

U.S. PATENT DOCUMENTS 6,282,646 B1 * 8/2001 Hendry et al. ............... 713/100
6,970,173 B2 * 11/2005 Ciolac ........................ 345/544

* cited by examiner

*Primary Examiner*—Tammara Peyton
(74) *Attorney, Agent, or Firm*—Beth L. McMahon; Richard J. Gregson; Charley A. Johnson

(57) ABSTRACT

Numerous shortcomings exist in prior generation adapter cards for supporting remote consoles for multipartition computer systems. Emulation using memory in the adapter card supports some remote functions so that they appear to be resident on the host computer system to each partition. Additionally, the host computer system memory can be used in one mode to support the emulation of extended mode video console support functions. Scoreboarding and hardware compression are used to limit the volume of data required to be updated to support the emulation.

15 Claims, 17 Drawing Sheets

*(Existing System)*

*Software Module by Component*

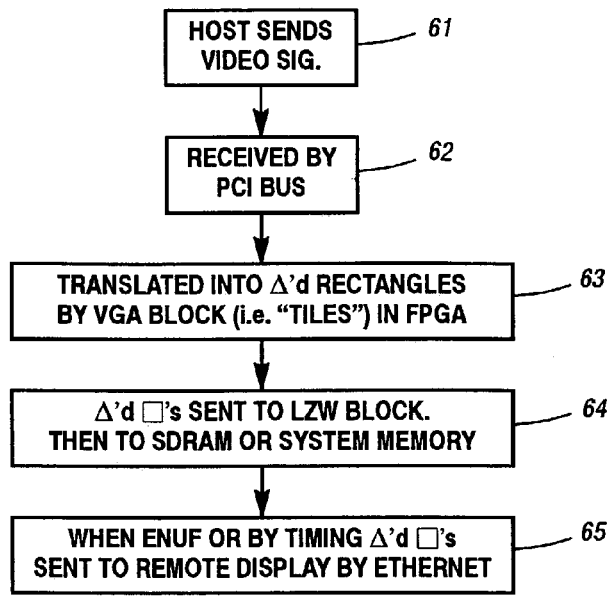
*Figure 6A*
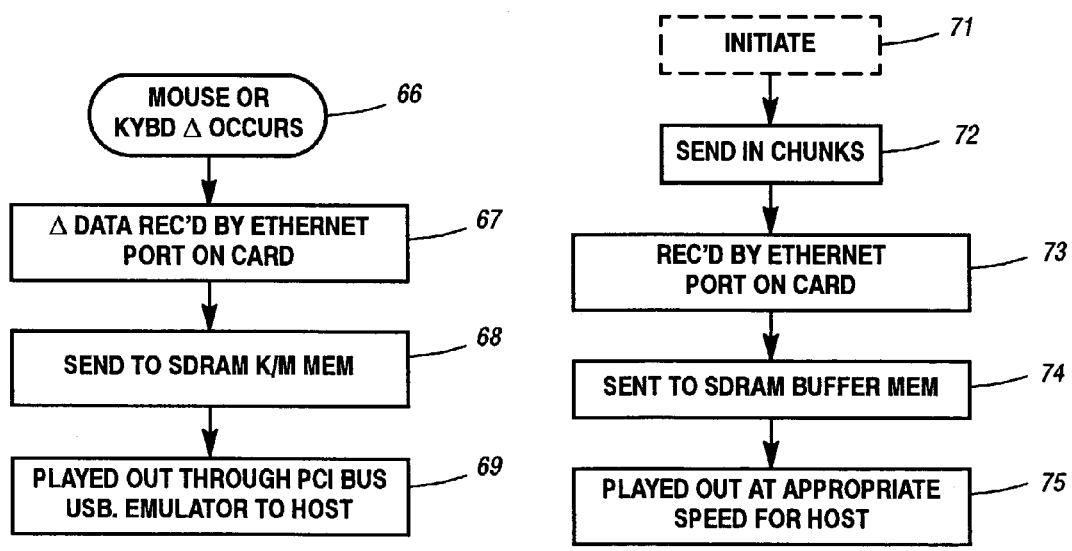
*Figure 6B1*  *Figure 6B2*

| scanline | Tile: word 0, bit 0 | Tile: word 0, bit 1 | | Tile: word 7, bit 31 |
|---|---|---|---|---|
| #0 | 0x00000000-0x00000007 | 0x00000008-0x0000000F | | 0x000007F8-0x000007FF |
| #1 | 0x00000800-0x00000807 | 0x00000808-0x0000080F | | 0x00000FF8-0x00000FFF |
| #2 | 0x00001000-0x00001007 | 0x00001008-0x0000100F | | 0x000017F8-0x000017FF |
| #3 | 0x00001800-0x00001807 | 0x00001808-0x0000180F | — | 0x00001FF8-0x00001FFF |
| #4 | 0x00002000-0x00002007 | 0x00002008-0x0000200F | | 0x000027F8-0x000027FF |
| #5 | 0x00002800-0x00002807 | 0x00002808-0x0000280F | | 0x00002FF8-0x00002FFF |
| #6 | 0x00003000-0x00003007 | 0x00003008-0x0000300F | | 0x000037F8-0x000037FF |
| #7 | 0x00003800-0x00003807 | 0x00003808-0x0000380F | | 0x00003FF8-0x00003FFF |
| | Tile: word 8, bit 0 | Tile: word 8, bit 1 | | Tile: word 15, bit 31 |
| #8 | 0x00004000-0x00004007 | 0x00004008-0x0000400F | | 0x000047F8-0x000047FF |
| #9 | 0x00004800-0x00004807 | 0x00004808-0x0000480F | | 0x00004FF8-0x00004FFF |
| #10 | 0x00005000-0x00005007 | 0x00005008-0x0000500F | | 0x000057F8-0x000057FF |
| #11 | 0x00005800-0x00005807 | 0x00005808-0x0000580F | — | 0x00005FF8-0x00005FFF |
| #12 | 0x00006000-0x00006007 | 0x00006008-0x0000600F | | 0x000067F8-0x000067FF |
| #13 | 0x00006800-0x00006807 | 0x00006808-0x0000680F | | 0x00006FF8-0x00006FFF |
| #14 | 0x00007000-0x00007007 | 0x00007008-0x0000700F | | 0x000077F8-0x000077FF |
| #15 | 0x00007800-0x00007807 | 0x00007808-0x0000780F | | 0x00007FF8-0x00007FFF |

FIGURE 9

Video component of FPGA
Data Flow diagram
Showing all paths/for all modes

Video component of FPGA
Data Flow diagram
VGA mode, generic host driver

Video component of FPGA
Data Flow diagram for
Direct frame buffer access

Video component of FPGA
Data Flow diagram for host buffer

USB component of FPGA
Data Flow diagram

SYSTEM FOR SUPPORT OF REMOTE CONSOLE BY EMULATION OF LOCAL CONSOLE WITH MULTIPATH DATA FLOW STRUCTURE

This patent relates to remote management and support of computer systems with emulation of a local console, and more particularly the means by which such remote consoles may be efficiently and effectively supported at the host computer system.

BACKGROUND

Large computer systems including mainframes and enterprise servers have traditionally included a primary console to enable system administrators to configure and administer the computer system. These primary consoles typically take the form of a monitor, keyboard and mouse attached locally to the host computer system being monitored and controlled by the system administrator. Because of the demand for flexibility and the ability for system administrators to be located distant from host computer systems, remote consoles have been provided to emulate the primary console of the computer system on a remote workstation over a modem or network connection. In order for the remote system administrator to use such a remote workstation for a console, video information representing the screen of a primary console must be captured at the host system and transmitted over the network, preferably in near real-time and the workstation must produce a facsimile of the screen that would be at the primary console. Keystroke and mouse input and perhaps other inputs from the remote workstation must be transmitted to the host computer system and used by the system keyboard controller and mouse controller software to enable the remote system to be responsive to input from the user console.

In many systems, remote console emulators typically access the host computer system bus to obtain video information and to transmit that to the remote console which has a substantial impact on the system bus performance in the host computer. Special software is also often required such as drivers and interrupt mechanisms running on the host computer which also impact the performance of the host computer.

There have been a number of alternate approaches to remote console support described in at least the following U.S. Pat. Nos.: 6,321,287 issued to Rao et al., 5,440,699 issued to Farrand et al., 6,098,143 issued to Humphreys et al., and 6,385,682B1 issued to Emerson et al. Our own related invention has been published as an international publication No. WO 00/70472 on 23 Nov. 2000. All of these patents and publications are hereby incorporated by reference.

Significantly, not one of these prior publications or patents provides for the emulation of the entire console at the remote location including significantly a boot volume or other data drive from which the host computer system and the emulation card may be brought up and initialized. This becomes especially important in multi-processor computer systems where the size of the system is increasable by adding a cellular partition, and wherein each partition is likely to have its own need for a management console, and thus its own need for a boot volume. In prior art, although there was a console-related data volume available and access to a boot disk, in all those cases the boot disk or other data volume located on the host was required to be attached to a peripheral controller associated with the hardware that was supporting the remote console. In the case of our publication (WO 00/70472), this would have been the peripheral device interface 48 of its FIG. 1 which is attached to the host system. Where there are multiple partitions in a multiprocessor system, the prior art required each partition to have such a connection and associated local data volume. Accordingly, removing the need to have a peripheral device interface or a controller for a local disk drive, CD ROM or other data volume in the context of a host computer system having multiple partitions each of which may require a remote console support unit, a way needed to be found in which one could obviate the need for a local disk drive in such a position.

Also, a system having both emulated graphics display support and remote data volume support would be advantageous in the context of using remote consoles.

Additionally, as graphic displays became more important and prevalent, the amount of information that needed to be transferred in order to support remote consoles became larger and a way to minimize the amount of data transfer between the remote console and the local support for the remote console became more important.

Finally, where multiple Operating Systems of various types may share a single computer system, a single system for handling the above-described functions in an adapter card is a strongly felt need.

Accordingly, the invention described herein addresses itself to these needs.

SUMMARY OF THE INVENTION

The present invention provides a remote management console support system which completely emulates the functions of the remote console in a local adapter card within a partition of the host that said remote console may be used to manage. Using our invention, we can provide all console components in a single adapter card without multiple redundant parts (except for the local adapter card) for managing multiple partitions in a single computer host system. The invention supports initial boot, OS installation, application installation and data access, display of video screen, one active keyboard and mouse pair, and eight singular reuse console screens, i.e, it supports eight simultaneous Displays. In our preferred form, any active display (of the eight) may request ownership of the active keyboard and mouse pair to support remote software installation and repair. Our overall approach has been to emulate the remote functions within the memory of the adapter card that supports the remote console (or consoles) through specialized buffering, timing and data compression functions.

Using both compression and video score boarding, very small amounts of information are actually required in order to maintain active remote display screens. Additionally, by designating the adapter card which supports the remote consoles as a bus master on the system bus (meaning that it can operate as an initiator and has certain understood privileges in interacting with the system bus), we enable the use of system memory to support video display data updates without interrupts and at higher speed that we could even using local adapter card memory.

Further, this last feature may not be supported in some operating systems during all phases of operation (since some OS's don't recognize legacy VGA) hence we decided that the video score boarding, including but not limited toVGA (video graphics array) score boarding function will be accomplished within the adapter card itself, employing the same compression mechanisms and data reduction or sampling techniques for maintaining the video display information within the adapter card or within the host memory system.

BRIEF DESCRIPTION OF THE DRAWINGS

FIGS. 6A, 6B1, and 6B2 are flowcharts illustrating the steps in the process of supporting the remote console in accord with the preferred embodiment of the invention.

FIG. 7 illustrates the frame buffer layout used to reduce the amount of data needed to track changed video data for standard video VGA modes as used in the preferred embodiment of this invention.

FIG. 8 illustrates the scan line/tile layout used to reduce the amount of data needed to track changed video data for extended video modes as used in the preferred embodiment of this invention.

FIG. 9 illustrates the first two tile rows in a frame buffer, to demonstrate how the frame buffer address is mapped to 64 byte tiles.

DETAILED DESCRIPTION OF THE PREFERRED EMBODIMENT

Figure 1:
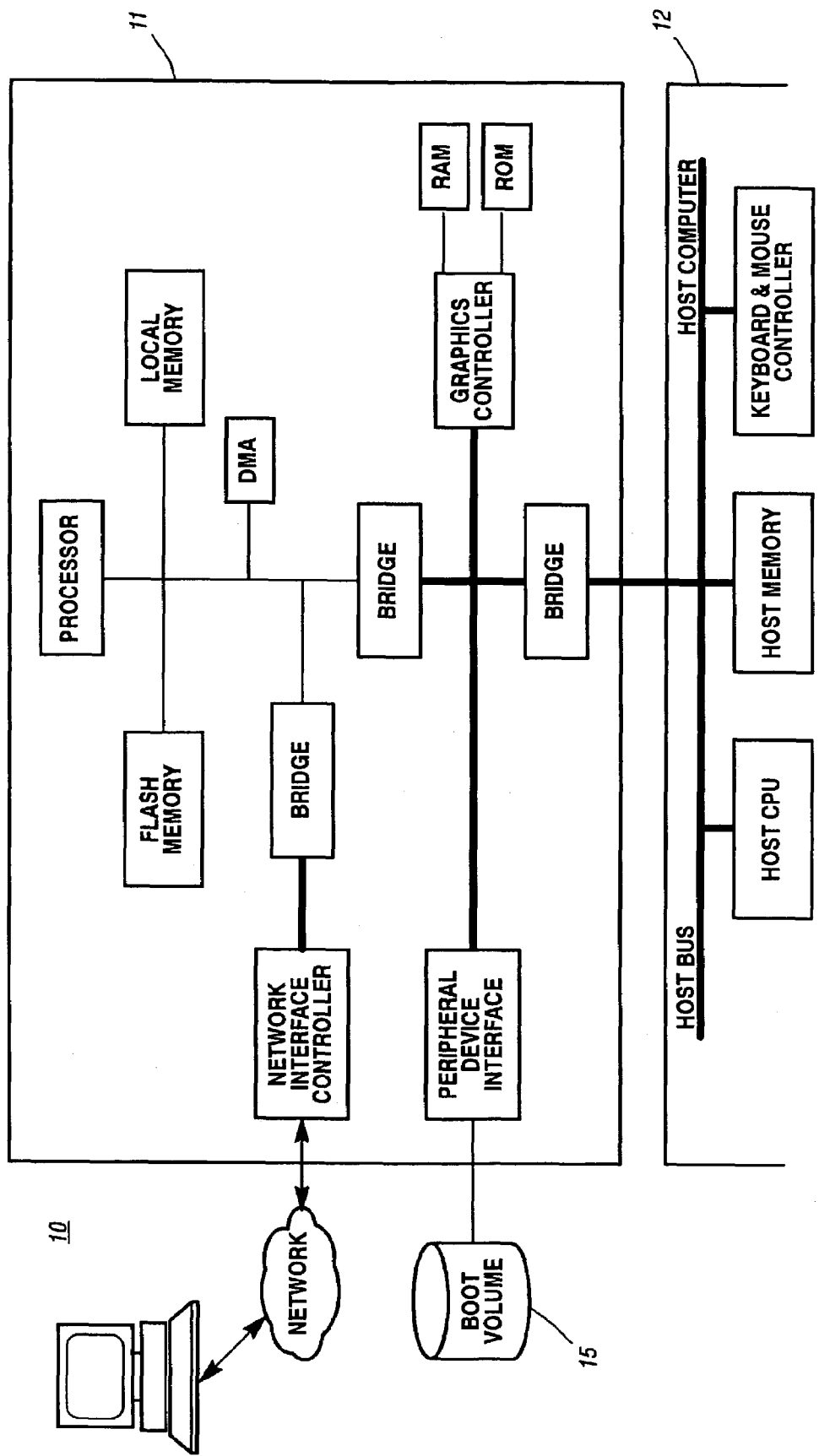
FIG. 1 is a block diagram of a system with adapter card for remote console emulation as detailed in our prior patent publication referenced above.

As described in our Background section, remote console support has been historically important in supporting large scale computing systems. In FIG. 1, our previously developed remote console support system hardware 10 is illustrated at a high level. Generally, the host computer system 12 with an associated adapter card 11 acted as the graphics controller, peripheral device interface, and network interface controller for the remote computer system 14 which accessed the support adapter 11 through the network 13. As mentioned previously, one of the limitations of this configuration was the need for a boot volume 15 supported by the peripheral device interface within the remote console support card 11, which was needed to perform boot functions for the host computer system 12.

Figure 2:
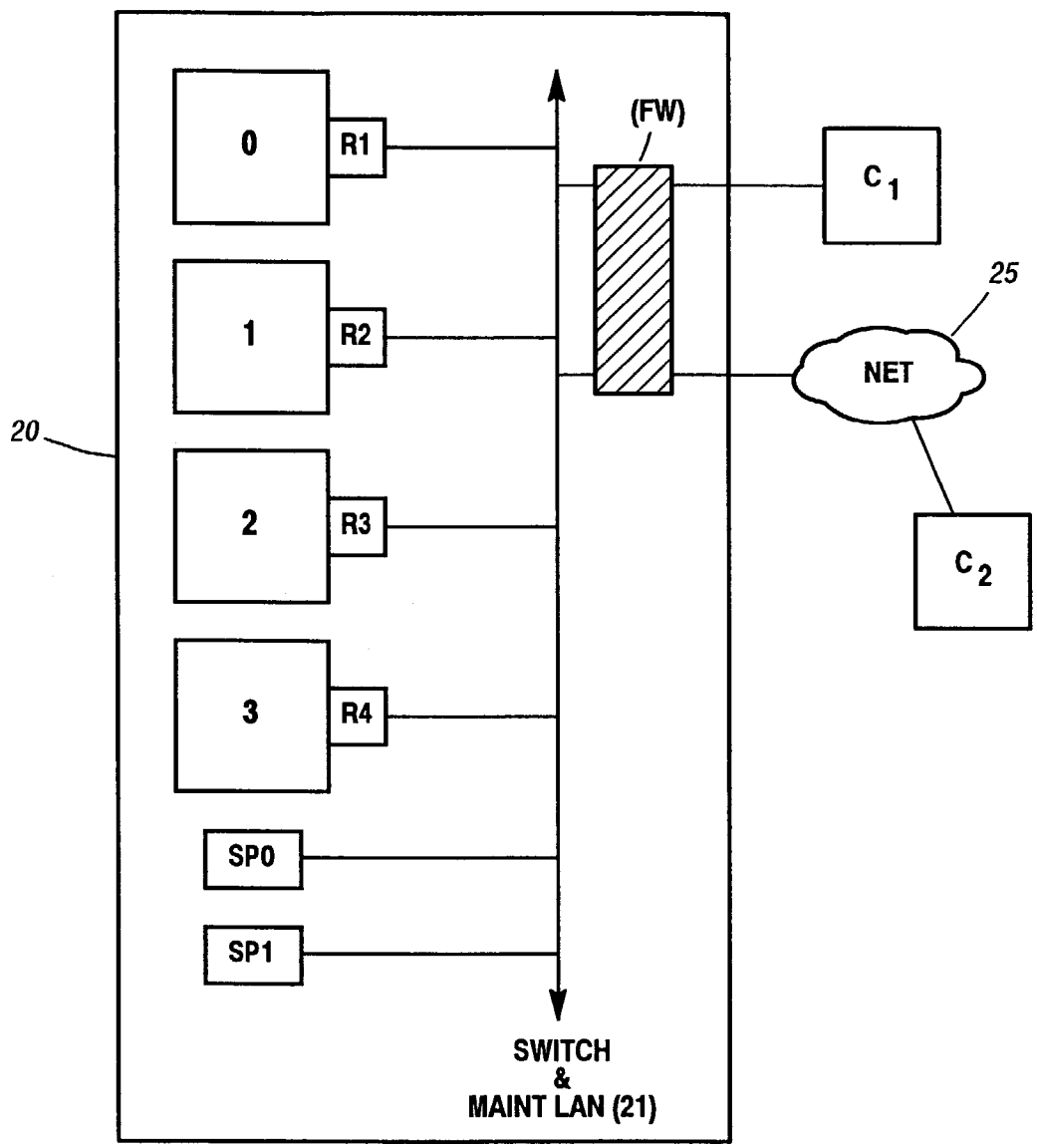
FIG. 2 is a block diagram of a multi-processor computer system having multiple partitions, each partition containing a remote console adapter card.

In FIG. 2, a modern multi-processor computer system 20 is illustrated. Such systems are the primary target of the preferred embodiments of this invention. The multi-processor computer system 20 has four cell partitions, cells 0-3, each of which may contain a number of instruction processors, memory, and associated peripheral devices and other components. A redundant pair of service processors (service processor 0 and service processor 1) may be used to support functions of the partitions, report malfunctions of the partitions, and generally perform housekeeping functions for the entire host computer system 20. A switch 21 allows the consoles to address any one of the cell partitions and/or the service processors as may be desired by the operator of the console. (A preferred embodiment switch is the Netgearm 8×100BaseT switch, but many commercially available and proprietary switches are useable). For illustration purposes only there are two consoles shown, C1 and C2, with console C2 being a remote workstation available through a network 25 and a firewall 26 to address the switch 21 to access the individual remote console adapter cards R1 through R4.

These remote console support adapter cards R1-R4 in the preferred embodiment are mounted in a 3.3 volt 33 MHz PCI slot (although one could use others, such as a 66 MHz PCI slot) on the boot PCI bus to provide remote console services to the partition. An application software program we call Partition Desktop, running on a remote workstation communicates with the inventive adapter card system on the host system and thereby replaces the need for direct attachment of a video monitor, mouse, and keyboard to the partition. This allows an operator to use the remote workstation in this case C2, to operate a server partition. The functions normally conducted through direct-attached monitor, keyboard and mouse and viewing of the server's VGA output in a local window at the remote workstation are supported. Additionally, any workstation running a portion of Partition Desktop we call by the descriptive name Data Server, can be used to serve any of the partitions' (preferably USB-type drive such as) CDROM and floppy disk media, either in the physical disk format or ISO 9000 image format mounted on a workstation or service processor hard disk as though they were attached directly to the server partition in a manner described here within. Thus, use of this invention enables loading of software packages and enabling the operator to boot the remote server partition directly from media mounted in the above manner from workstations and data storage volumes wherever they may be located. The media will appear to be mounted on the emulated floppy drive, zip drive or CDROM drive implemented in the R1-Rn card of the respective P0-P(n−1) partition. Additionally each card Rn emulates a USB to Ethernet device compatible with the Microsoft remote NDIS (RNDIS) interface, which provides the host with an Ethernet interface to the network. This provides administration specific network connections used for management functions, such as software installation and system maintenance.

Figure 3:
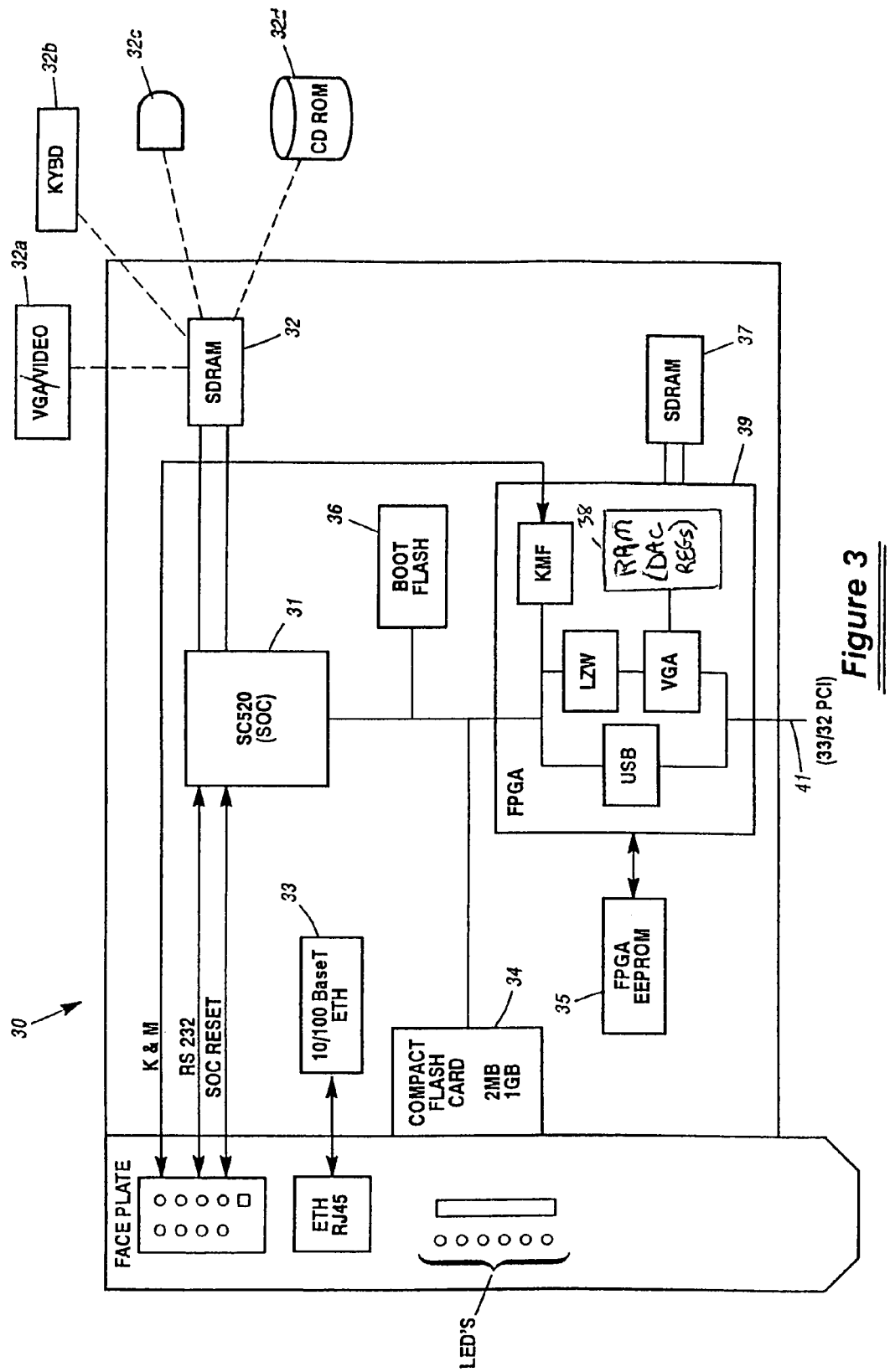
FIG. 3 is a block diagram illustrating the main components of the preferred embodiment inventive remote console support adapter card.

In FIG. 3, a preferred embodiment remote console support adapter card 30 is illustrated. The adapter card primarily consists of common components including a microprocessor 31 (for which we prefer to use the AMD System on Chip SC520), associated SDRAM chips 32 in which the required remote functions are emulated, a 10/100 BaseT Ethernet chip 33 which connects the adapter card to an Ethernet port on the switch, a compact flash memory card 34 providing the OS and application code to the card microprocessor, an EEPROM for the FPGA (Field Programmable Gate Array) logic 35, some flash memory 36 to provide boot instructions for the card microprocessor, an SDRAM chip 37 to support the FPGA VGA functions frame buffer and buffer memory for the USB functions 39 (and SRAM chips to support LZW intermediate dictionaries).

In our preferred designs we removed the RAMDAC (RAM with Digital to Analog Converter) as a separate component, because there is no need to get analog values at a local console since there is no local console. Instead, we replicated its palette registers (DAC REGs) in a RAM portion 38 of our FPGA 39. (Any conversion to analog values is done on the client console machines, so no standard RAMDAC is needed). The field programmable gate array (FPGA) 39 has various components structured there within that are described in more detail below. The SDRAM 32 is used generally for storing an intermediate and Host usable frame buffer memory for the VGA or other VIDEO 32a, and buffer memory for the emulated USB devices (keyboard 32b, mouse 32c and CDROM drive or floppy drive or zip drive each of which is a supported BIOS boot device 32d).

The adapter card is connected to the host computer system through a PCI bus 41 and has a RS232 connection for allowing debugging, and a SC520 reset port to the SOC (system on a chip, i.e., the SC520) to perform reset without disturbing the functional logic configured within the FPGA. Each adapter card will support up to 8 remote consoles, but only one of these can be active at any given time, in other words, only one can have the keyboard and mouse (and USB) functions supported by the host at any given moment. In the preferred embodiment, a local console client program will indicate to the user on his screen whether his is the active console and users with identical priorities can contend for control. The local screen display that provides this indicator will not be part of the video scan line data transfer operations detailed in this application.

The FPGA 39 is populated with a number of circuits important for this invention. Among these is a VGA circuit (VGA), a data compression circuit (we use an LZW implementation which is well known, (described in U.S. patent application Ser. No. 10/120,467, titled Hardware-Based LZW Compression Data Co-processor) but other data compression circuits may be used if desired) and a USB port controller emulator. The USB port controller is included because the keyboard, mouse, CDROM, floppy, and Ethernet devices are presented to the host as USB devices. In order for the host to see a USB device, it must first see the USB host controller and USB root hub that they are attached to. The FPGA also supports PS2 protocol keyboard and mouse function circuitry (KMF circuitry), which can be used to support a keyboard and mouse to a host BIOS or operating system that does not support USB protocol, thus, our invention will function with numerous host operating systems and platforms. Further, the system has been designed to support both keyboard and mouse functions for both PS2 protocol and USB protocol. In the case of USB we support both the devices ((K)eyboard and (M)ouse) and the controller (host bus to device bus bridge) because multiple USB controllers are supported in a host system. For PS2 K and M we need to connect to the host system's PS2 controller as only one K and M is allowed in a PS2 system.

In general then, the host computer system supports a console by providing signals over the PCI bus 41 and optionally over the PS2 bus to the remote console support adapter card 30, and the remote console adapter card communicates with the host operating system in a manner that makes it appear to contain the devices required for a local console to the host operating system.

The microprocessor 31 has an associated memory 32 on which it draws to communicate over the Ethernet port 33 to the remote console systems (not shown). The SDRAM 32 therefore must contain sufficient memory to support the emulation and translation of the various supported devices and the protocols to coordinate with the remote programs supporting the user interface (Keyboard (32b), Video (32a), and Mouse (32c) also called KVM). Additionally, an area of memory 32d must support the boot volume functions but providing enough of a buffer that when the host memory is looking for boot volume information, the microprocessor 31 in cooperation with the Ethernet connection through port 33 will be able to populate the SDRAM area 32d with a sufficient amount of buffered data to provide the boot volume information through the PCI bus 41 without experiencing a timeout. Sizing of the space available for the SDRAM area 32d should be appropriate to the economic considerations for the particular implementation envisioned. Typical sizing may be on the order of 64 Megabytes for systems such are the ones we have designed this invention for.

Figure 5:
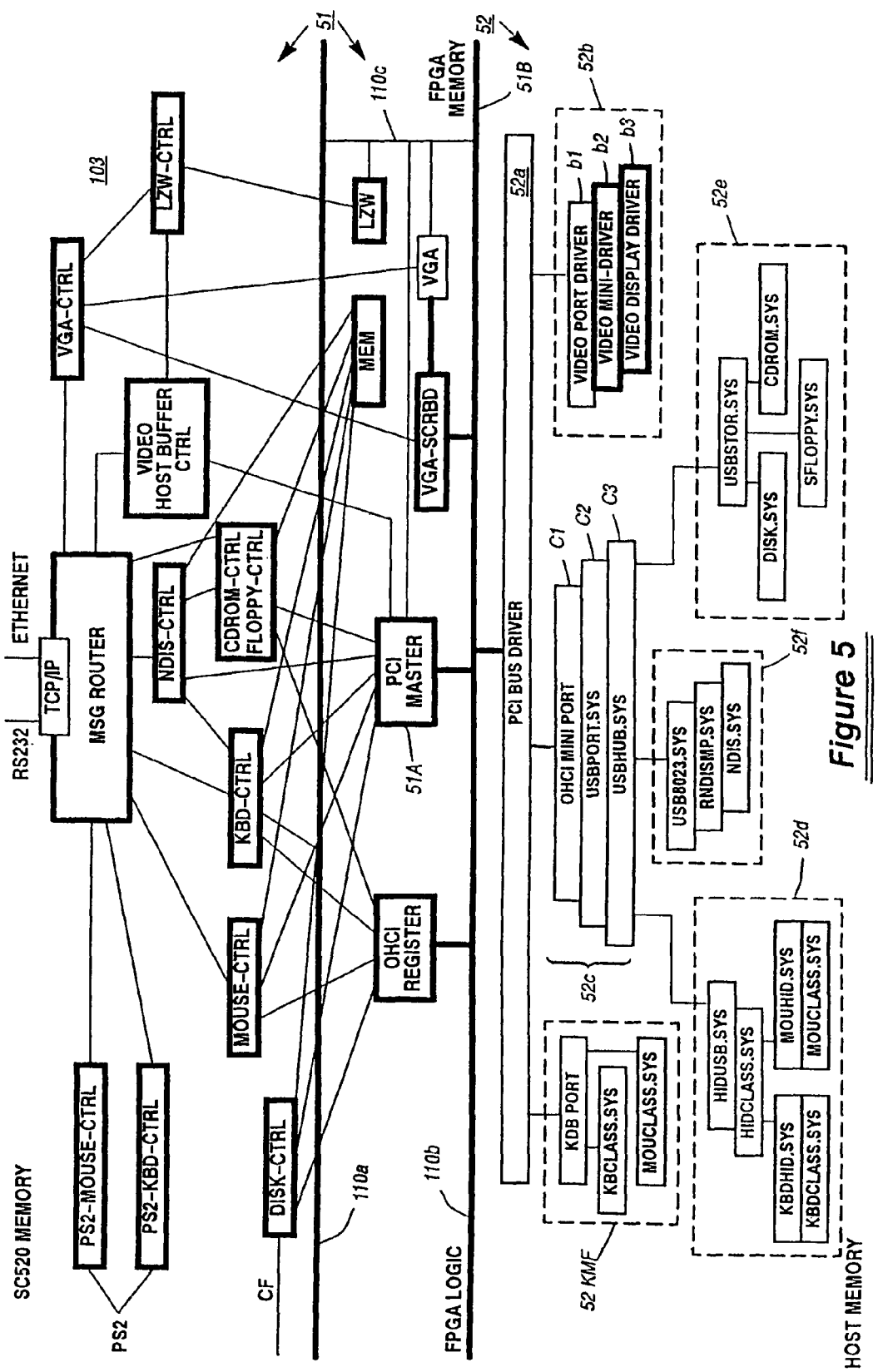
FIG. 5 is a block diagram illustrating the various components of the operating system kernel and their relation to the remote console support adapter card.

Associated subroutines have been designed and implemented in the card to emulate each of the supported devices. The block diagram of FIG. 5 illustrates the data flow through the component memories and compression if used to support these functions.

Refer back to FIG. 3. The compression algorithm support hardware in block LZW of the FPGA (39 in FIG. 3) generally takes incoming VGA information from the PCI bus 41 and compresses it before forwarding it on to the microprocessor 31 for temporary storage in the VGA video portion 32A of the SDRAM 32. (The LZW hardware is automatic. The VGA and VIDEO routines load rectangle requests (i.e., information contained within a designated rectangular area of information on the VIDEO display that is determined to be of interest) into LZW then read the compressed data out of LZW). The VGA block of circuits within the FPGA is a set of registers and logic that performs the standard PCI to FPGA memory and FPGA memory to PCI transformations required by the VGA specification (preferably all 13 modes). The VGA block is used by the BIOS and by any OS without Unisys or other proprietary system-optimized drivers, and in the preferred embodiment is in fact a commercially available VGA logic block for FPGAs.

Figure 10A:
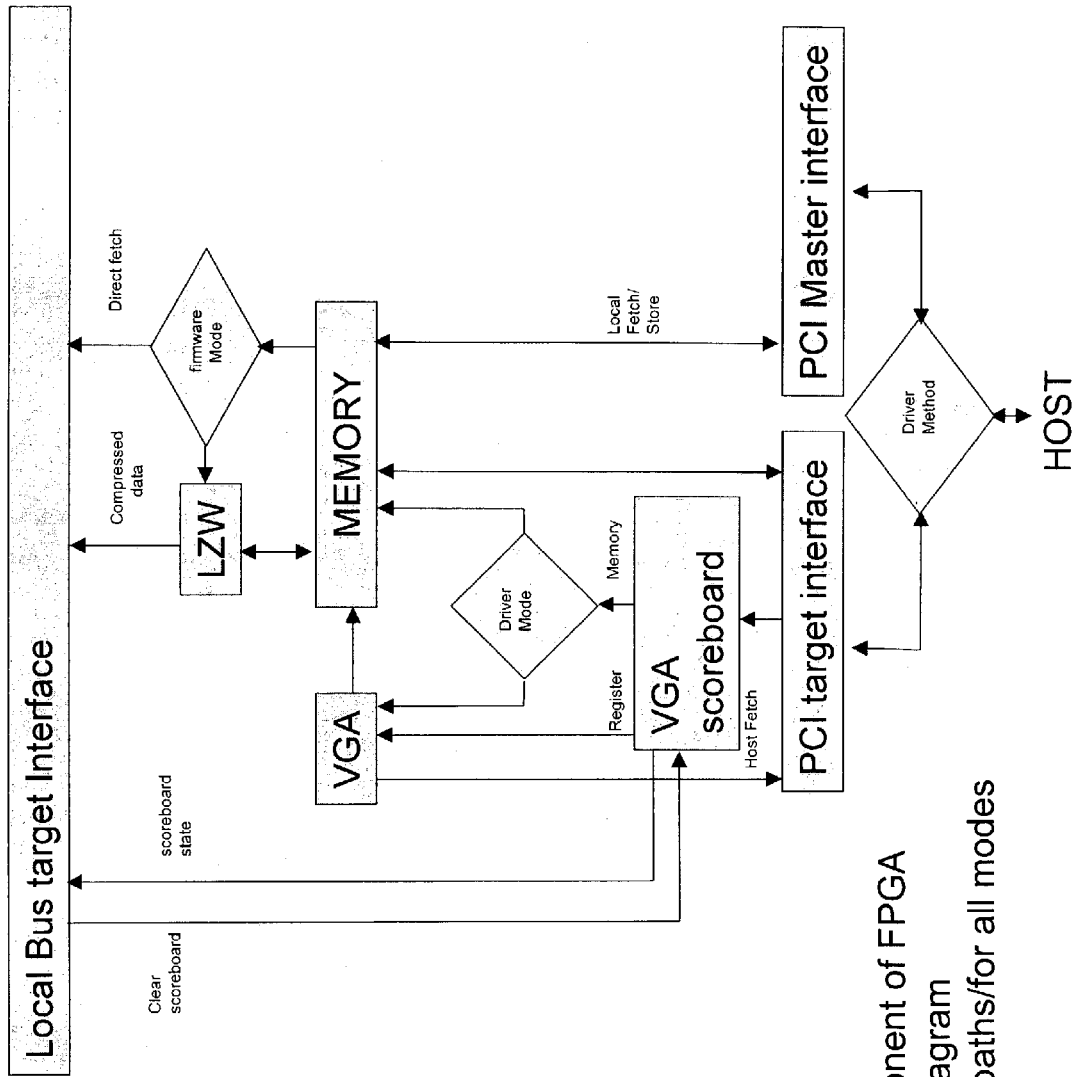
FIGS. 10A-E are data flow chart diagrams in accord with a preferred embodiment of the invention.

Three video operating modes are supported in the preferred embodiments. The blocks of FIG. 10A illustrate the various interacting parts for the system on the adapter card that handles the data flows. Each method can use LZW or not. The first mode is called Standard IBM 13 mode VGA, or Legacy VGA mode. The other two modes are extended video modes, the second is called Direct frame buffer mode or extended video with scoreboarding. The third mode is also an extended video mode called Host frame buffer mode or host driver rectangle mode. (The description below of the three modes relies on FIGS. 10A-D, the component blocks of which correspond to items found in FIG. 3 by same or similar names. The Local Bus target Interface block is the bus for the SC520 microprocessor SOC. The PCI target interface and PCI Master interface share PCI bus 41, one operating as a busmaster interface, the other as a non-busmaster interface. Firmware glue-like items are in diamond blocks, providing firmware support for the flow of data from the components. The VGA, scoreboard, and Memory blocks are physically located within the SDRAM 37 and the FPGA 39. The arrows in these Figs. Represent the direction of data flow among the components.) Regarding all the FIG. 10 figures, not that the Local Bus target Interface is in communication with the microprocessor SC520 on the adapter card, and that the diamond-shaped components are generally logic, be they software or hardware enabled. Note also that FIG. 10 E illustrates the data flow for USB support, which is required to emulate a local data volume, and also supports the Keyboard and Mouse emulation functions.

Figure 10B:
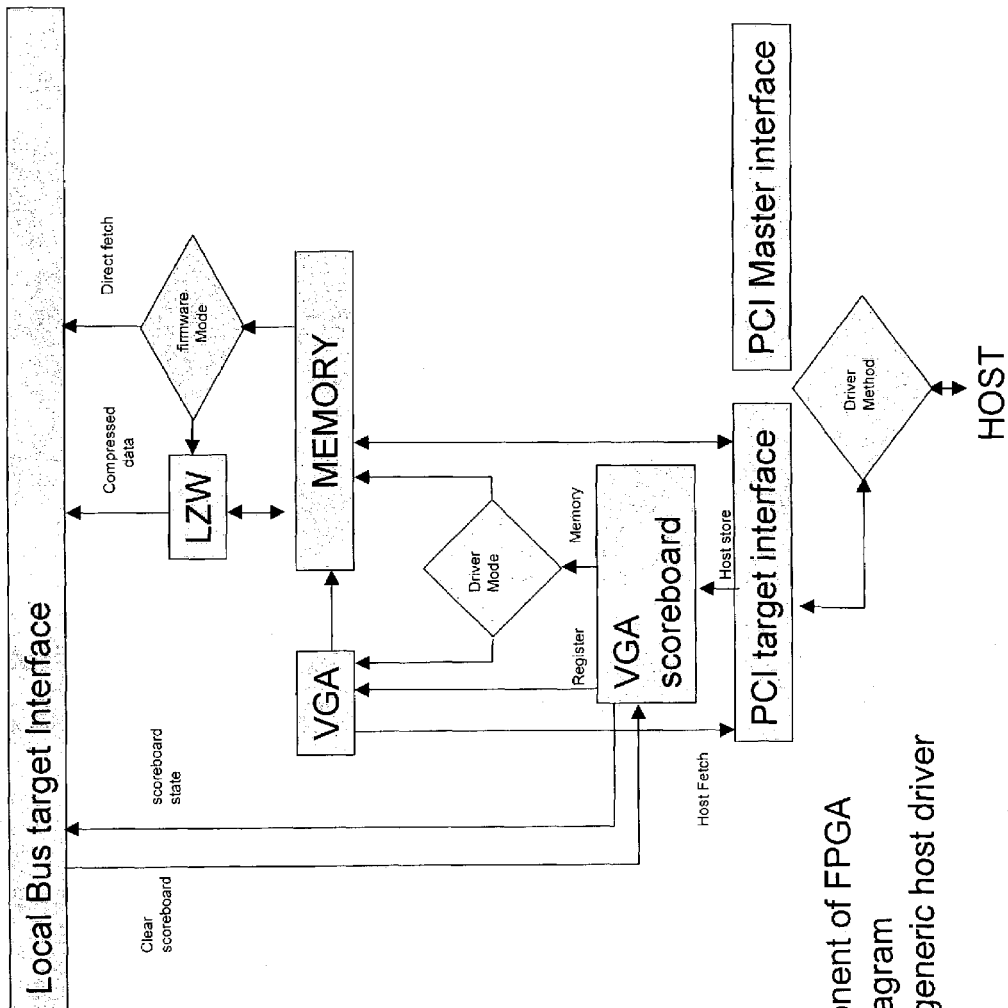

The three modes are:

Mode 1: legacy VGA (corresponds to FIG. 10B)

In this mode, a standard VGA driver is running in the host environment (this includes pre-boot BIOS). The host will be writing to standard VGA I/O ports (0x3cO-0x3df) and standard VGA memory addresses (0xa0000-0xbffff) to modify the video. Because standard VGA modes support only 4 bit color in the graphic modes, two pixels are stored in each byte. The 8 bit byte is the smallest datum supported by PCI. These two facts tend to cause many read-before-write cases when drawing to a VGA controller. The arrows in FIG. 10B represent the direction of data flow for this mode. Note that the PCI Master interface is not used, as there is no storage of video data on the host for emulation purposes in this mode. Contrast this with Mode 3, below illustrated in FIG. 10D.

The console emulation hardware of the inventive adapter card:keeps track of the contents of all of the legacy VGA registers, and allows the values in these registers to be accessed by firmware running in the console emulation environment. (That is, the adapter card. This allows the video mode to be determined in the console emulation environment).

ensures that all host VGA memory writes cause corresponding writes to memory accessible from the firmware running in the console emulation environment. (This allows the current video screen contents to be seen through the console emulation environment).

writes to an appropriate location with the VGA scoreboard whenever any write to VGA memory occurs. (This allows firmware running in the console emulation environment to be able to periodically determine which areas of the screen have changed). See FIG. 7 for a detailed illustration of what the memory management looks like for our preferred embodiment of this mode.

Figure 10C:
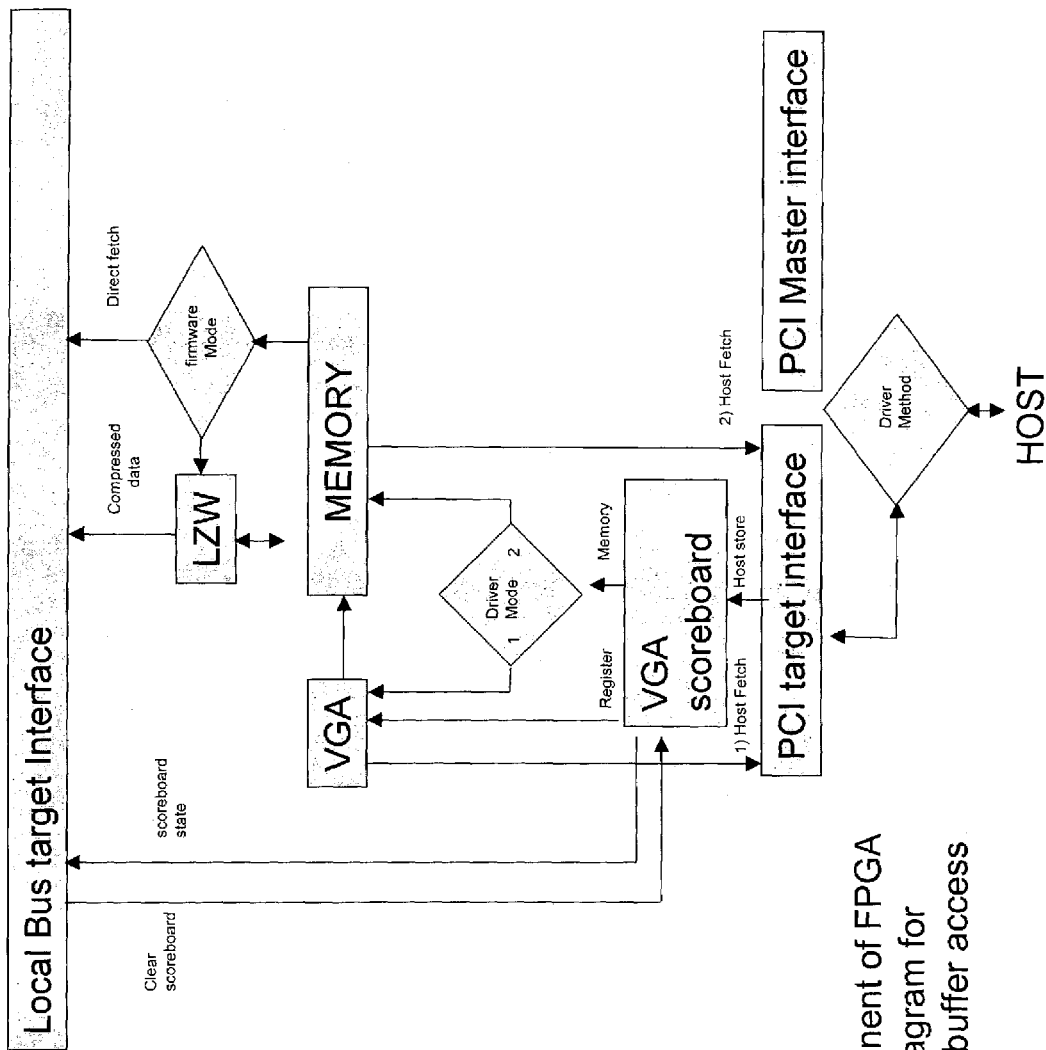

Mode 2: extended video mode, hardware scoreboard mode (corresponds to FIG. 10C.).

This mode provides for enhanced video resolutions better than Mode 1, (that is, the "enhanced resolutions" include 800×600 and 1024×768 pixel modes, at both 256 and 65536 color modes, while standard VGA provides a maximum of 640×480 at 16 colors) and requires a custom host OS driver that has basic understanding of the remote console emulation hardware and firmware. This mode provides for ease of host driver implementation, while still allowing high resolution video modes. In this mode, the host driver will determine the video mode by writing a specific structure to a pre-determined PCI-mapped memory location, and will change video data by writing to a video framebuffer at another pre-determined PCI-mapped memory location. Writes to the video framebuffer will cause the console emulation hardware to do appropriate scoreboard writes (refer to FIG. 8 for detailed illustration of preferred embodiment memory management). The video mode structure, video framebuffer, and scoreboard are all accessible from the firmware in the console emulation environment. LZW compression hardware will preferably be utilized to both read and compress changed data from the video framebuffer (the scoreboard is consulted to determine what data actually changed) but less preferred embodiments can use other compression or no compression if desired. Thus, this method relies on a non-standard communication, either by extending the use of the standard VGA registers or by communication through a Frame buffer. This method has two major sub cases. The intention is to allow simple driver development to allow large screen sizes and color depth, while retaining most of the speed advantage of a full host driver. For both cases the firmware can poll the scoreboard or be interrupted on first change. For both cases while the scoreboard is being cleared, the PCI target forces a retry (using standard PCI mechanisms), until the clear is completed. In operation:

1) The data is passed through the VGA engine (e.g. the 800×600×16 color mode, which is the obvious extension of the 640×480×16 color mode of standard VGA), and 2) The data is read and written directly to the frame buffer using the address translation provided by the PCI memory Base Memory Register (BAR). In the preferred method the desired frame buffer shape is communicated via a message at addresses in the memory addressed by the BAR and not displayed. VGA registers could be used in a nonstandard way or the register set could be expanded. (In preferred embodiments the desired frame buffer shape is 2048 bytes for each scanline of data on the video display, at offset –0 from the Base Address Register (BAR) address for the video function of the card.)

Figure 10D:
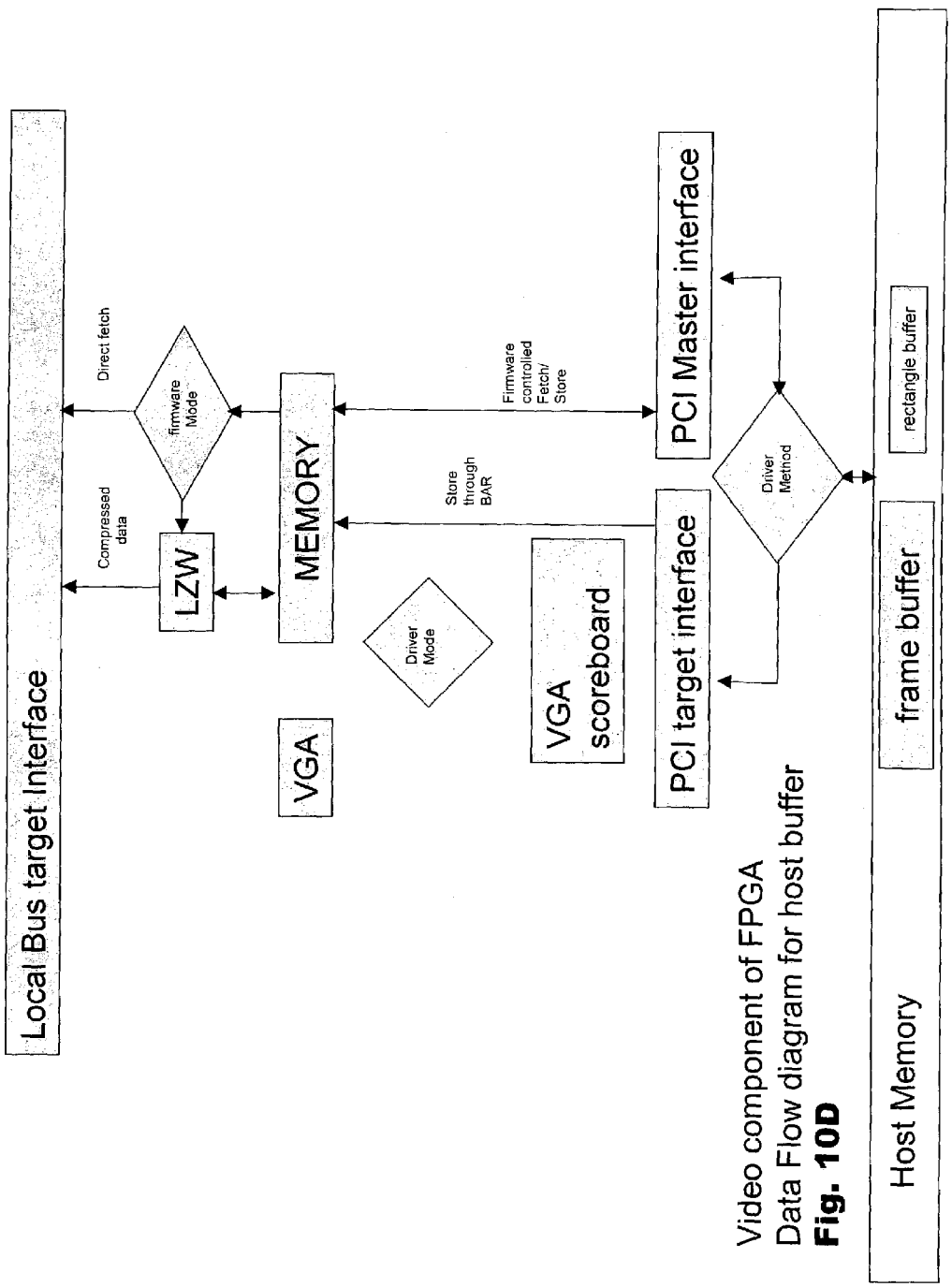
Figure 10:
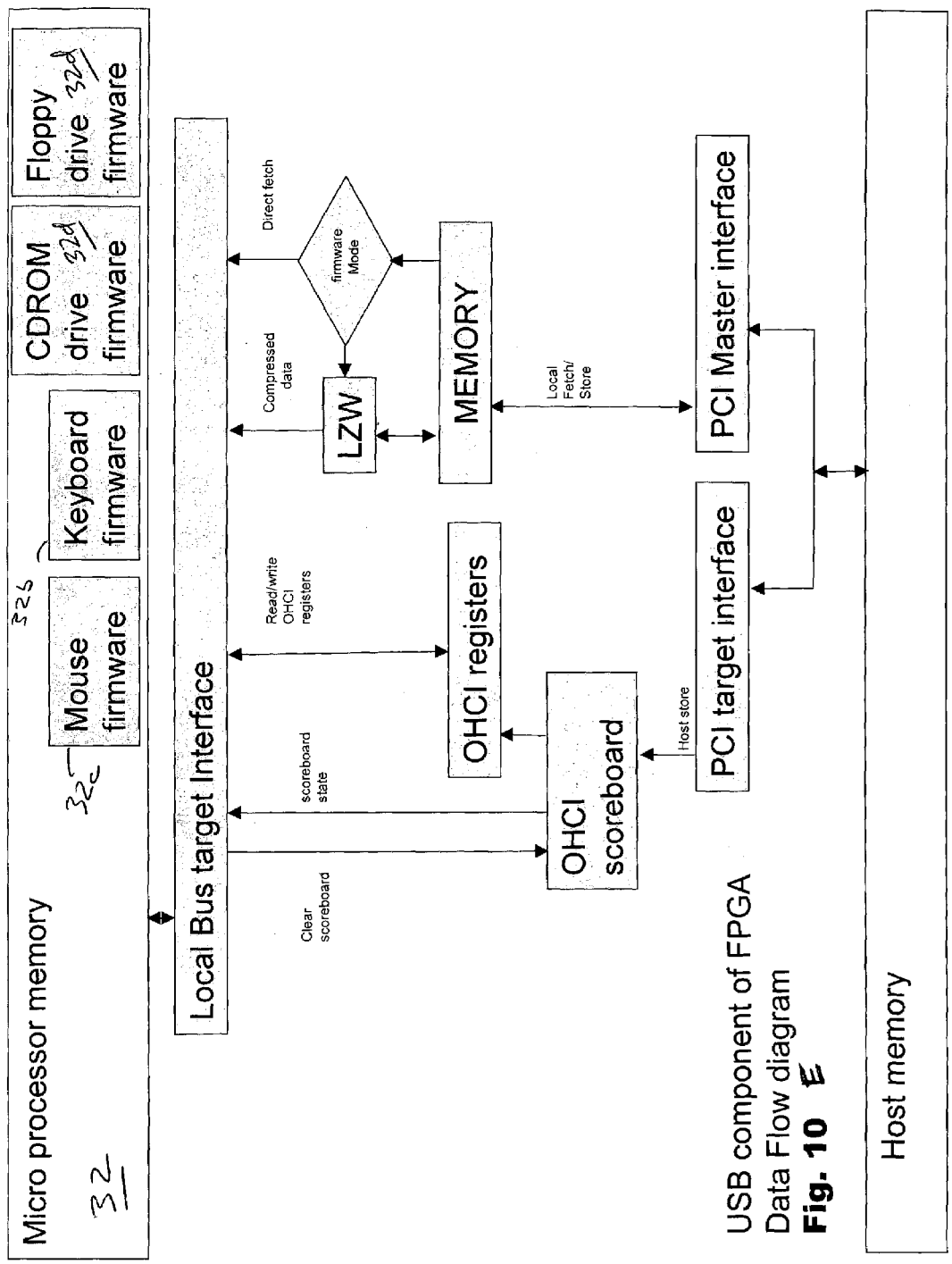

Mode 3: extended video mode, host driver rectangle mode (corresponds to FIG. 10D)

The best performance for large screen configurations requires support for host frame buffer and cursor support and is therefore the most preferred method. In the preferred implementation the host driver records changed areas in the host frame buffer. The firmware on the card uses the PCI Master interface to load the change information into non-frame buffer memory. The firmware processes the change lists and requests, via the PCI Master interface that the changed data be copied into memory and then the firmware either directly packages the memory to be transferred to the remote clients or utilizes the LZW function to compress the changed areas before transfer Using the PCI Master interface enables the use of the host memory for the frame buffer and rectangle buffer, which turns out to be much faster than using local memory on the card, due to the DMA data transfer speeds available using the bus master interface.

The firmware communicates with the host driver through the use of a non blocking Queue structure (in memory and FPGA, not shown) that ensures that data flow is not interrupted by a filled queue. The firmware also has separate structures for read and write control (in memory and FPGA, also not shown) to avoid the requirement for interrupts to the host or to alleviate host driver stalls.

There are two minor cases which call for changes in the buffer and queue sizing. For the active console the algorithm is tuned to improve latency, for "observer" consoles the algorithm is tuned for lowest band pass.

This mode provides for enhanced video resolutions better than Mode 1, and requires a custom host OS driver that has advanced understanding of the remote console emulation hardware and firmware. Thus, this mode provides optimal performance, but requires a more complex host driver. In this mode, the host driver will determine (set) the video mode by writing a specific (known) data structure to a pre-determined PCI-mapped memory location, and will change video data by writing to a video framebuffer in its own (main) local memory, as well as by writing the rectangular coordinates of all changed screen coordinates into another local (main memory) buffer, known as the rectangle buffer. The physical address for the framebuffer and rectangle buffer are chosen by the host driver, and are communicated to the console emulation firmware via data fields in the video mode data structure. The console emulation firmware uses the PCI Initiator hardware function to read the rectangle buffer and contents of specific areas of the framebuffer as needed. (The scoreboard is not used in this mode.) LZW compression hardware will be utilized to both read and compress changed data from the video framebuffer (the rectangle buffer is consulted to determine what data actually changed).

Refer to FIG. 10E which illustrates the data flow function of the system for supporting data transfer though the USB interface. The firmware that supports the emulation of the Mouse 32c, Keyboard 32b, and drives 32d (which could be multiple drives and/or drive types, so there is only one numeral for the drive firmware) is preferably located in the microprocessor SC520 firmware memory 32. The OHCI registers are in the USB block of the FPGA of FIG. 3, as are the OHCI scoreboard logic components. (OHCI stands for Open Host Controller Interface, a well known standard). The PCI USB target and Master interfaces are both used the Master interface is used to move data to/from the host memory when data is being written/read to/from a drive as in 32d. Making temporal connections between a remote device and a local host is problematic especially for fast devices like a CDROM drive, emulation of USB devices makes the speed of the device almost irrelevant as USB provides a command/response model to transfer data. Accordingly, drive firmware 32d will not reply to the read command until data is staged in the FPGA buffer. A Floppy controller or IDE controller is driven by register response time, mitigated only by rotational delay timing. These timing considerations make both remote emulation of either drives or media more difficult. Host driver software for floppy disks are generally more timing tolerant because the media has been historically unreliable and therefore the software is often error tolerant. This fact can be exploited by signaling an error when data is not yet available for reading. This reliance on error handling for floppy drives is not used in the preferred implementation for USB data flow, because the command response mechanism of USB is sufficient to allow us to generate waits sufficient to fill our memory buffers, thus hiding from the host that the device is being emulated on the adapter card and the media is remote.

Figure 4:
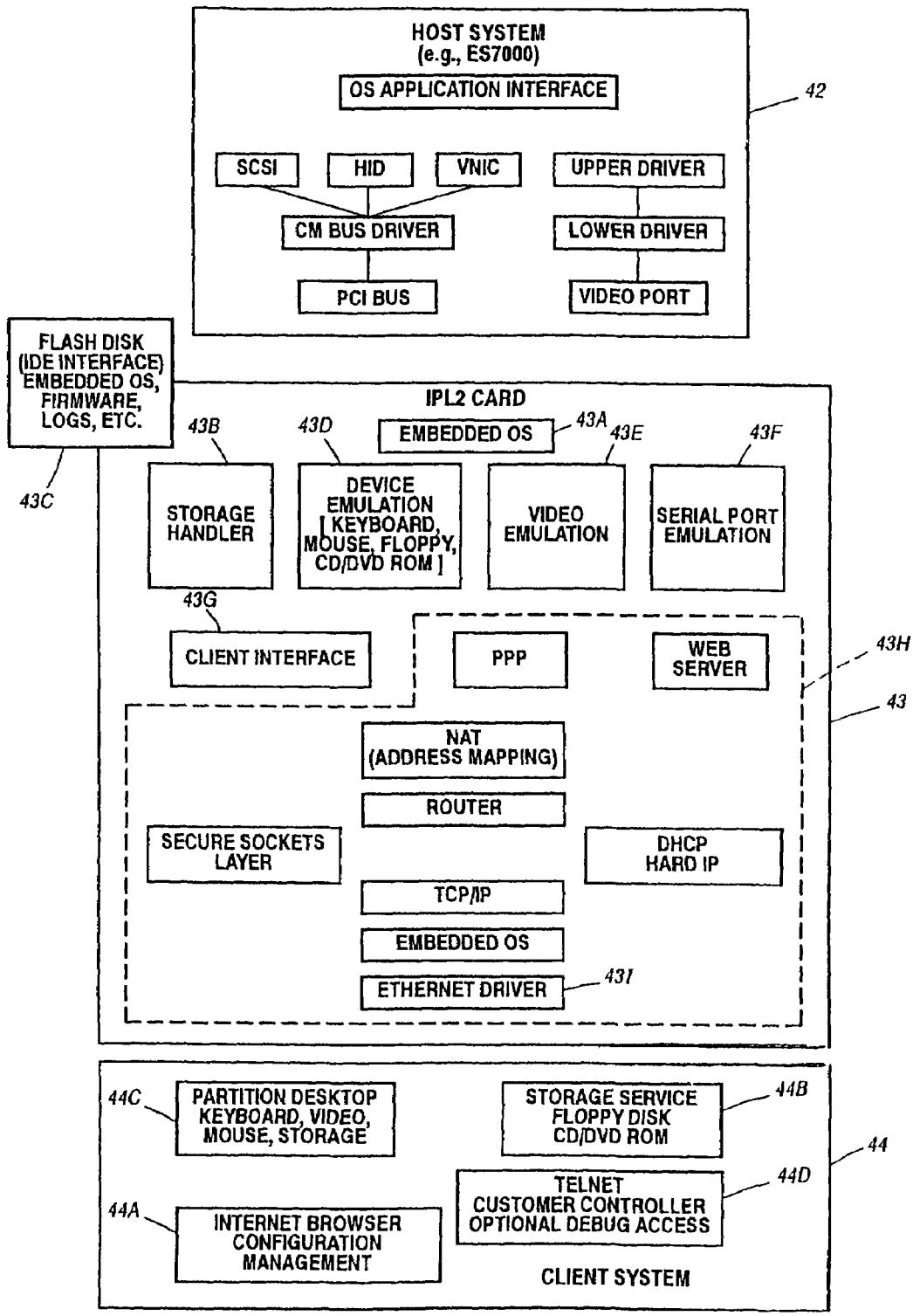
FIG. 4 illustrates the major components of software and their respective hardware domains for functioning in accord with preferred embodiments of this invention.

In FIG. 4, the major software components that interact to enable preferred embodiments systems are illustrated among the three major hardware components host system 42, remote console support adapter card 43, and remote client system 44. In the adapter card 43, an embedded operating system 43A supports the functioning of all the software components of the system. The embedded software may be conveniently supplied by a flash disk 43C that can be changed to provide further compatibility with host or client system software and communications protocol changes. This is the compact flash card illustrated as item 34 of FIG. 3. Also on this flash disk may be additional firmware, history logs, and other components that may improve or modify the functioning of the card as revisions to the hardware or software may occur. Within the card, software handles the various emulation features required for this invention. These include a storage handler 43B, device emulation for the keyboard, mouse, floppy, and CD devices 43D, video emulation 43E and serial port emulation 43F, the last of which is only necessary of the card 43 is used for legacy systems. A client interface 43G will be used to manage the other components 43H needed to communicate with the client system 44. Also included will be an Ethernet driver 431 because in the current embodiment of the system, an Ethernet channel is used to communicate to the network which communicates with the client's system 44. The client's system will have its own operating system and Ethernet driver and software support components for communicating over the network to the adapter card 43. These components are well known and not shown on this figure but assumed to be subsumed in component 44A the internet browser and configuration management software on the client's system. We use ssh/putty, which is a secure form of telnet, that it, telnet protocol with encrypted data for enhanced security (TELNET block 44D) for our debugging of CM and the Host system. Needed storage service software 44B for handling controls of the floppy disk, CD, drive systems will of course be provided on the client's system. The client's software adapted to deal with the communications protocol and needs of the adapter card 43's software components, particularly components 43B, 43D, 43E, and 43F as well as any peculiarities of component 43G will be handled by something we call a partition desktop 44C.

The host system 42 will have a set of operating system driver interfaces for handling the set of devices emulated on the card. These drivers are the standard operating system drivers for PS2 keyboard, PS2 mouse, USB OHCI controller, USB keyboard, USB mouse, USB data volume (floppy, CDROM drive), and VGA. In addition to these standard drivers a video driver specifically optimized for the video capabilities of the card is supplied for selected operating systems.

Refer now to FIG. 5 in which the various components of an OS kernel needed to support the functioning of the various storage components, mouse, keyboard and video components are illustrated in the host computer system 52 which communicate through the PCI bus driver 52A to the host PCI bridge 51B within the adapter card 51.

Generally the diagram is organized as follows. There are two full-width horizontal lines 110a and 110b on this FIG. 5. Between these lines is all FPGA logic space except for the area to the right of the only vertical line 110c intersecting both of the horizontal lines, which represents the FPGA's SDRAM space.

All the space above horizontal line 110a is the SDRAM space of the microprocessor (SC520 memory). The boxes (unnumbered) in this area 103 represent sets of software procedures, indicated by function name. (In the preferred embodiment, this is where the software doing the message routing for TCP/IP is resident).

All of the space below the horizontal line 110b represents HOST memory and the boxes are named by their Microsoft Windows 2000 driver names.

Note that there are corresponding software procedures (boxes above line 110A) for all of the Microsoft Windows driver names (boxes below line 110b). Additionally, there are software procedures to handle the FPGA Logic components to the left of line 110c.

The video display driver 52b has three components: B1, the video port driver which packages the video mode commands and sends it through the PCI bus driver to the Video device, the video display driver, B3, which receives information from the application driving video within the host and organizes it into a set of data structures that can be read by the Video device. If particular changes to data in the frame buffer are identified in a changed rectangle queue, changes to the cursor are made in the cursor data area. The frame buffer, Queue area and cursor areas are directly addressable by the video device; and B2, the so-called video mini-port driver, which reserves Video device resources and initializes the Video hardware. The other components of the operating system kernel interfacing with the other console components are generally referred to as components 52c. C1 is the main port component which receives signals from the PCI bus driver indicating changes or data from the keyboard or mouse of the console as well as data from the disk or data volumes associated with the console and sends them through the USB port dot sys and USB hub dot sys components C2 and C3 into their appropriate dot sys files managed by the OS kernel. In order to interrupt these signals from the keyboard and mouse, the operating system kernel has several sets of driver components 52d which help it interpret these signals by determining first whether they are from the keyboard or from the mouse and if from a keyboard or a mouse what particular class of keyboard and mouse they are so that the data can be used by the applications API which are run by the operating system of the host. A similar set of software components 52e recognizes a similar set of data types and configurations from floppy disks, CD ROMS, and other disk systems. Additionally, network communications recognized by USB channel devices have their own set of software components 52f. In this embodiment standard hardware interfaces are preferred, enabling the use of standard system drivers.

Referring briefly back to FIG. 3, note that it is the job of USB OHCI register circuits (not shown) of the FPGA 39 to generate an interrupt to the microprocessor whenever the OHCI register state is changed by the Host software. The emulation of the USB devices (host bridge, Drives (CDROM, floppy), keyboard and mouse) is handled by code in the microprocessor SOC SC520. It is the task of the microprocessor SOC to update the state of the OHCI registers to reflect the state of the emulated USB devices (as determined by device emulation and host commands) and also to provide the loading/storing of data segments between host and FPGA memories as requested by host USB commands in a timely fashion via the PCI master memory mover as required by the various documents of the USB OHCI standards.

A good overview of the process by which this works is outlined in FIGS. 6A, 6B1, and 6B2. FIG. 6A describes a communication for a video from the host to the console support adapter card and to the supported remote consoles, and the 6B FIGS. describe communications from the remote console through the adapter board to the host of the mouse and keyboard functions in 6B1 and the communication back and forth of data from the boot or other data volumes on the remote console in 6B2.

In FIG. 6A, the host first sends its digital video data in step 61; these are then received by the PCI bus and sent to the adapter card. In the adapter card, these data changes are recorded in a frame buffer and in the row and column structure of the scoreboard in step 63. These are the so-called tiles which in the preferred embodiment we use to limit the amount of data traffic needed track change to the local video frame buffer. This is done using one of three methods described with reference to FIGS. 7, 8, and 9:

Note:
1. A special layout is required for the legacy modes in order to reap any benefits in those modes. The only difference in the hardware implementation between these layouts is the bit mask used to determine the guardWordNumber. The same 32 guard word registers can be used for both legacy modes and extended modes.
2. In the extended modes, 2048 bytes was chosen as a scanline size because it is an even power-of-2, and is large enough to encompass the largest scan line of any of the video modes we are likely to encounter. This has the effect of minimizing the number of tiles that get marked "dirty" when horizontal or vertical lines are drawn in the frame buffer. E.g., if a vertical line were drawn in the frame buffer, it would appear as a vertical line if it were drawn on the diagram.
3. In the legacy modes, we have no choice over what the scanline size is, and it is NEVER a power of 2. (In actuality, it is either 80 or 100 bytes, depending upon whether the mode is 640×480 or 800×600.) Thus in the legacy modes, a line drawn within the frame buffer usually won't look like a line when you draw it on the diagram. This reduces the effectiveness of this guard word scheme for the legacy modes, but the performance gain is still significant. In particular, horizontally-based drawing will have almost optimum performance benefits. Vertically-based drawing, on the other hand, will largely defeat any optimization, although even in the worst case there will be a 20% performance gain over the firmware having to read the entire screen.
4. The legacy modes are 4 bits-per-pixel, but each of the bits within a given pixel are referenced via the exact same bit address within the 0xA0000 thru 0xAFFFF range. The VGA hardware actually determines which one of the 4 bits of the pixel is being written by examining the contents of another register. But for what we want to do, we don't really care which of the pixel bits are being written, all we want to do is to mark the tile that contains the pixel as "dirty".
5. Given the functions just described, hardware pseudocode (from a software engineer's perspective) to handle a PCI write directed at the IPL2 card looks like this to indicate what scoreboard bit has been changed and needs to be written: (Note: "Guard" means "Scoreboard". Also, note that the dimensions of the tile array are arbitrary and that a 32×32 array means that each bit represents a manageable sized portion of the display screen. An 8×8 size would likely have each bit representing far too large an area to be useful, and a 128×128 matrix may be too unwieldy.)

if legacy VGA access (FIG. 7)
    /*if address <0x000B0000—no. let text mode fall thru here too*/
    guardWordNumber:=bits 15.11 of address
    guardWordBit :=bits 10.6 of address
    set bit #guardWordBit in register #guardWordNumber
    /*endif*/
    pass access on to VGA chip (as usual)
    else (FIG. 8)
    byteOffset :=byte offset within PCI-mapped area (within FPGA SDRAM)
    if byteOffset <0x00200000 // 2 Mbytes
    guardWordNumber:=bits 20.16 of byteOffset
    guardWordBit :=bits 10.6 of byteOffset
    set bit #guardWordBit in register #guardWordNumber
    endif
    process the write (as usual)
    endif
6. Pseudocode describing "read+clear" that occurs when the firmware reads a guard word looks like this:
    lock-out PCI access (respond with "PCI retry" while locked)
    supply contents of requested guardword to firmware
    clear the value of the guardword to 0
    re-enable PCI access The LZW circuit of the FPGA can provide a compressed format expression of the information requested by commands to the LZW unit. The commands are in the form of coordinate pairs in the frame buffer. The LZW unit compresses the requested areas and allows it to be read by the microprocessor via register accesses. The Microprocessor then removes the compressed data from the output Queue of the LZW unit and stores the data as in the microprocessor SDRAM. When either enough time has elapsed or a signal is received over the Ethernet port controller 33, the changed data from the video frame buffer 32A is forwarded by the microprocessor 31 to the remote console through the Ethernet controller 33.

In an alternative embodiment (Mode 3 described above) which currently only runs with Microsoft Windows Operating Systems, the video frame buffer component 32a is not kept in the SD RAM block 32 on circuit board 30. Instead, this information is kept within a dedicated main storage area of the host computer system. Because the circuit board 30 is qualified as a bus master on the host system bus, it operates with the same level of priority as any other instruction processor on the system bus of the host. The The PCI master DMA function of the FPGA has better access to host memory than the host CPU has to FPGA memory. The master can stream host memory into FPGA memory 16 words for each PCI arbitration but the CPU can access FPGA memory only 1 word for each arbitration e.g. 7 overhead clocks +1 clock per word. So to move 16 words the host takes 128 clocks and the master takes 23. The host CPU can access host memory, much faster than the master can. The master takes about 128 clocks to fetch a byte, a word or 16 words it is worse for store. The host CPU can take advantage of 3 levels of cache (such as exist in the Unisys multiprocessor computer systems currently being sold) to improve a very common case in screen painting, namely reading and writing the same word or a small group of words many times in succession so the host buffer optimization is to let windows draw directly into a host buffer and then have the host CPU take a snapshot of changed rectangular areas. The areas of change can be copied into FPGA SDRAM by the PCI Master under control of the card microprocessor. The microprocessor analyzes the change list and sends the set of rectangles to LZW to compress. The compressed data is copied to microprocessor memory and staged to TCP/IP for sending).

In FIG. 6B1, the mouse or keyboard changes are sent from the remote console in step 66. In step 67, they are received through the Ethernet port on the support card 67. They are then sent 68 to the SD RAM keyboard and mouse memory areas on the support card. Following that they are played out 69 through the PCI bus USB emulator to the host system.

In FIG. 6B2, some initialization functions take place within the operating system software indicating that a data transfer is to occur in step 61. The data is then sent 72 in chunks appropriate to the particular volume from which it is coming or to which it is going. If it is coming from the remote volume, it is received by the Ethernet component on the adapter card in step 73, and from there sent to the SD RAM buffer in step 74 while the operating system and application software on the adapter card manages this buffer so that in step 75, appropriate chunks of data may be played out at appropriate speed to the host, such software adapted to avoid timeouts in the host to adapter card communication process.

Figure 7:
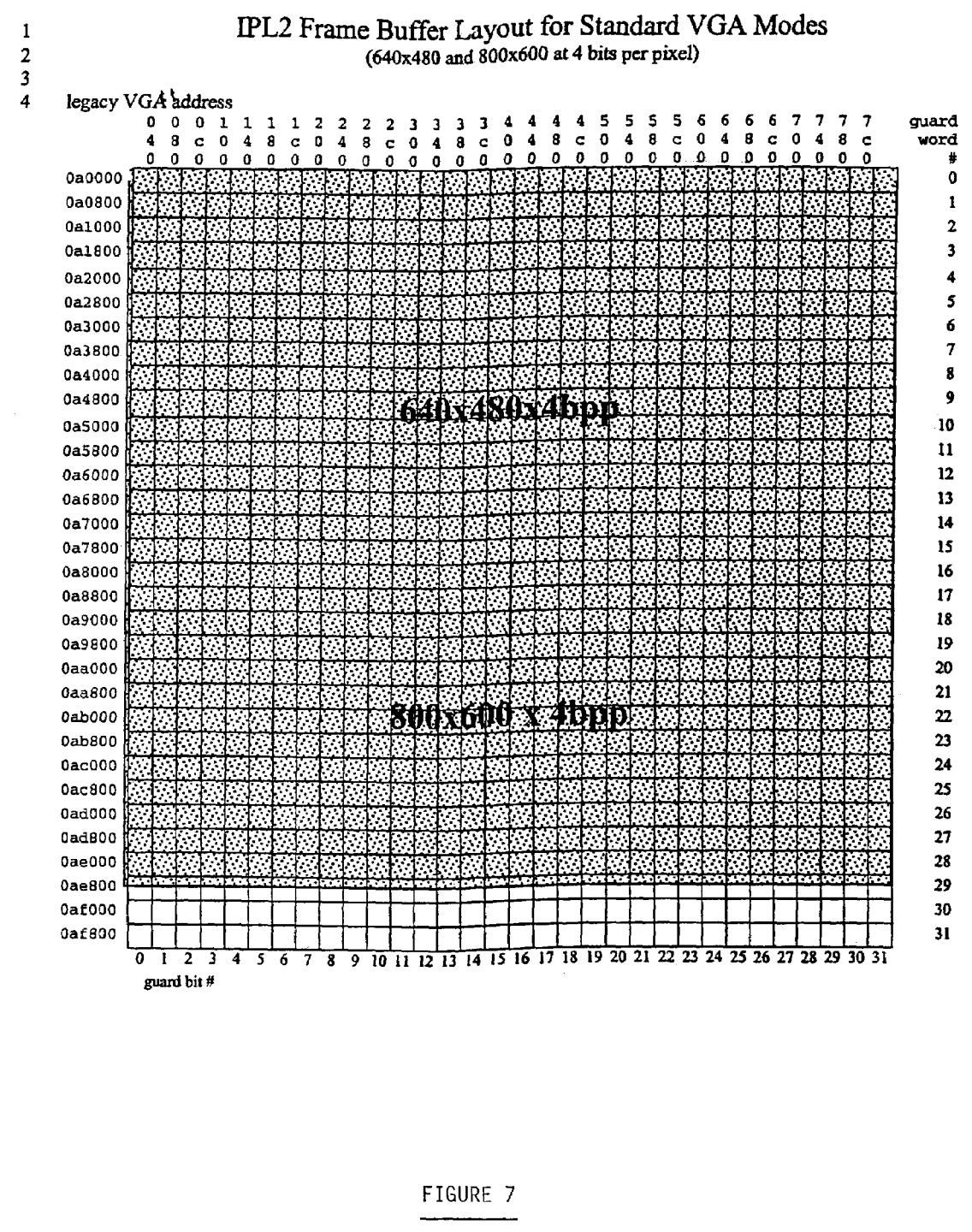

In FIG. 7, the frame buffer layout for standard VGA modes is illustrated broken up into what we are calling "tile" sized components. The tiles are sized based on a heuristics that consider the speed of the SC520 bus, the available logic space in the FPGA and the likely compressed size of the tiles. The addresses are byte offsets into the frame buffer, i.e., video addresses written by the Host.

The video frame buffer will be memory-mapped to a specified (predetermined) address in the firmware environment. This area can be accessed by the firmware either using normal memory accesses, or via a hardware-supplied LZW compression engine in the adapter card FPGA. (From the host side this memory will be mapped into the global system PCI address space.) The interface to this compression engine will be supplied by hardware. Any compression hardware could be used, but to be valuable, it must take as input a scanline size and rectangular coordinates, and return a compressed (LZW) byte stream that represents the pixel data within those rectangular coordinates. It should be possible for software to be able to choose when the compression engine state is reset, to enable multiple rectangular areas to be represented by a single compressed "blob" (binary large object).

Figure 8:
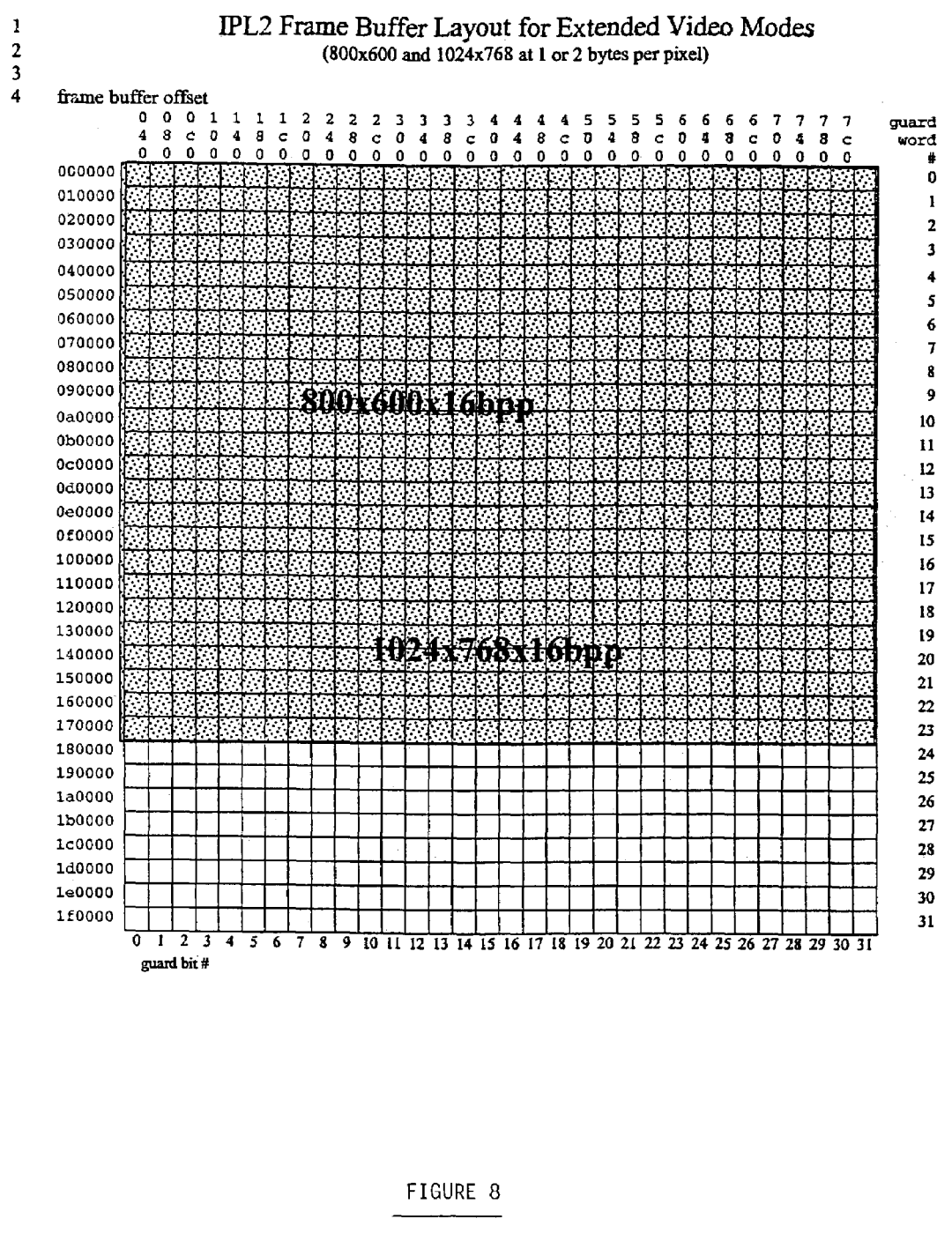

FIG. 7 is used to illustrate the following process.
1. Legacy addresses 0xa0000 thru 0xaffff (64 Kbytes) are divided into 1024 "tiles" (or scoreboard bits):
   a. 32 tiles "across" and 32 tiles "down".
   b. Each tile is 64 bytes of contiguous address space.
2. Hardware maintains 32 32-bit guard word registers; 1 bit of each guard word register represents a single tile.
3. For each write into the frame buffer, the hardware:
   a. takes bits 15.11 (5 bits) of the address as guardWordNumber, and bits 10.6 (5 bits) of the address as guardWordBit.
   b. tests bit #guardWordBit in register #guardWordNumber. If the bit is 0: set the bit, and FIG. 8 is for extended resolution video and the pseudocode described above applies (after the else statement).
1. Frame Buffer is organized into 1024 "tiles" (or scoreboard bits):
   a. 32 tiles "across" and 32 tiles "down".
   b. Each tile is 64 bytes "wide" and 32 scanlines "high" (area=2 KB).
   c. Each "tile row" is 2 KB wide, enough for the widest likely scanline.
2. Hardware maintains 32 32-bit guard word registers; I bit of each guard word register represents a single tile.
3. For each write into the frame buffer, the hardware:
   c. takes bits 20 . . . 16 (5 bits) of the address as guardWordNumber, and bits 10.6 (5 bits) of the address as guardWordBit.
   d. tests bit #guardWordBit in register #guardWordNumber. If the bit is 0: set the bit, and FIG. 9 is an illustration of an additional software tracking mechanism scoreboard for tracking low priority (display only) console clients. The tiles are smaller (64 bytes in area) so 1024 words are needed to keep the direty bits. This illustration show the first two tile rows in the frame buffer, demonstrating how frame buffer addresses are mapped to the 64 byte tiles. These display clients will get the images only at the slower rate. Thus, the slow client scoreboard will only track the last change made for the fast (display and active) client on this scoreboard, and when timing permits, the indicated dirty tiles will be sent to the display clients. Thus these changes may be cumulative before being sent. It is preferably kept as a software buffer in the SC520 memory.

"Snoop" Host Access of Legacy VGA I/O Ports

In order for the firmware to obtain accurate video images without corrupting the display state when the host is accessing the video in a legacy VGA manner, the firmware needs some way to "snoop" host reads and writes involving legacy VGA I/O ports (I/O addresses 0x3B0 thru 0x3BB and I/O addresses 0x3C0 thru 0x3DF). The most logical way to do this would be something like:
1. The firmware code receives an interrupt when any of these I/O addresses are accessed
2. Infirmware writes to a FPGA retry register causing the PCI interface to retry.
3. The firmware code reads the changed register value and notes if it changes the representation of the image in memory and adjusts the firmware memory read as necessary.
4. The firmware writes to the FPGA retry register, allowing PCI target access.

In the preferred embodiment, the VGA I/O register snoop function is accomplished using an additional dual port RAM block within the FPGA. One side, the "frontside", of the dual port RAM emulates the VGA I/O registers (which those of ordinary knowledge in this field recognize has its own peculiar addressing function). Thus, there is a unique RAM location for each VGA I/O register. Note that due to indexed I/O addressing of the I/O data registers by VGA, there are many more VGA I/O data registers than I/O addresses required to access those registers. The various indexed I/O addressing schemes used by VGA are duplicated within the FPGA, thus precisely emulating the VGA I/O register operation.

The other side of the dual port RAM is assigned to a linear memory address range of the SC520 such that each location (each VGA I/O register) has a unique address in the memory space of the SC520 thus providing the SC520 with read-only access to the "backside" of these duplicated registers.

VGA I/O registers located in the VGA controller as well as I/O registers normally contained in a RAMDAC are implemented using this method within the internal RAM 38 of the FPGA 39. Since local video display is not required, the digital to analog conversion function in a RAMDAC is not necessary. The registers that perform the RAMDAC palette function, however, are necessary. In the preferred embodiment, the RAMDAC palette-type registers implemented in the FPGA are the only such registers implemented in the design and they exactly accomplish the host VGA interface for those registers. This allows elimination of the external RAMDAC component (which would have done the unneeded digital value to analog value conversion) for the preferred embodiment. The firmware code polls the palette registers when color information is needed or the firmware can use the register scoreboard interrupt provided when the host writes to the palette registers to note that a palette change may have occurred.

Interrupt on Host Write to VGA space (Video frame buffer)

A hardware interrupt to the firmware occurs anytime the host accesses the "frontside" of the emulated VGA I/O registers.

Maintain "Dirty" Video State Via Software-Accessible Guard Registers (Tiles) for Video Scoreboarding.

To enable the firmware to provide video images with as little overhead as possible even with no host driver support, it is highly desirable for the hardware to implement a "dirty bit" scheme for keeping track of when rectangular regions of the video frame buffer are written (by the host). The goal of this scheme is to enable the firmware to detect which areas of the video image have changed with as little overhead as possible. One notable extra feature which we use in our preferred embodiments is that we encrypt and compress the video images before sending them to the remote client, and this is done using hardware components so that the load on the SC520 processor is minimal.

In such a scheme, the frame buffer is logically divided into fixed-size rectangular "tiles" (here the term rectangular is used to mean with respect to where on the user's screen the data represented in the frame buffer will appear). The hardware has 1 bit of register space to represent each tile. Whenever a write into the frame buffer occurs, the hardware:
  computes which register bit is represented by the address written
  if the bit is 0: sets the bit and (optionally) interrupts the firmware (software doesn't require an interrupt, but we use it for better performance if it is available)

The hardware provides some means for the firmware to be able to "read and clear" the bits representing all of the tiles. During this "read and clear" operation, the hardware would need to prevent any writes into video memory by the host (described in more detail with reference to FIG. 12). (If this isn't done, it would be possible for the firmware to miss a video change.) Determining the tile size in advance provides:
  for the hardware to maintain 1 bit of state for each tile,
  a relatively simple operation to compute which tile bit represents any arbitrary address within the frame buffer (e.g., given an address, a register# and bit# can be computed by a series of shifts and masks).

FIGS. 7 and 8 illustrate (described above) a mapping of guard bits onto the scan line information to form "tiles".

On a video monitor, the image is formed by a series of closely spaced lines on the screen called scan lines. They are so-called because the image is created by an electron beam scanning left to right rapidly and top to bottom slowly so as to trace out a number of closely spaced horizontal lines on the screen. The electron beam causes phosphor on the screen to glow and to possess a certain color in proportion to the intensity of that beam. These closely spaced lines merge to form a continuous image on the screen. There are a number of standard screen formats, each described by horizontal and vertical dimensions in pixels. Examples are 640×480, 800× 600 and 1024×768. Vertical pixels correspond to the number of horizontal scan lines. Thus in the examples, the number of scan lines for each format is 480, 600 and 768, respectively. Horizontal pixels are created by varying the intensity and "color" of the electron beam as it traces from left to right. Thus a screen image may be described by a linear sequence of electron beam intensities and "colors" applied in synchronization with the electron beam physically scanning the screen.

The value of intensity and "color" for each pixel may be encoded into a digital value and stored in memory. The normal function of a RAMDAC is to translate those digital values into electrical signals to cause the electron beam to output the corresponding value of intensity and "color" to the screen. (As mentioned previously, we only use a limited set of RAMDAC features in our preferred embodiments). Thus, a screen image may be described by a linear sequence of digital values in memory called pixel values. This arrangement is called a frame buffer memory.

Referring again to FIGS. 7 and 8, the values along the left of the diagram represent the address of the leftmost pixel value of each scan line. This may be defined as a base address of the scan line. The numbers along the top of the figure represent address offset values of each pixel in the scan line horizontally from left to right. Thus the actual physical address of any pixel value consists of the scan line base address plus the address offset value. If the addresses on the figure are computed, it can be verified that the physical address increments linearly going left to right, top to bottom. In addition, pairs of these base and offset addresses, describe points on a rectangular coordinate system. Thus on FIG. 8, 1024×768×16, the point (400,10000) (i.e. x,y) describes a point central on the screen. Also on FIGS. 7 and 8 are numbers on the right side with a heading of "guard word #" and numbers along the bottom with a heading "guard bit #". Note that a single guard bit is assigned to a VGA address offset range of 64 values (00h to 3Fh) and a single guard word is assigned to a VGA base address range of 32 values(00xxxh to 01xxxh). Thus, the "guard_bit", "guard_word" coordinate system is much coarser than the offset, base address coordinate system, but an exact mapping of one onto the other exists.

Thus there are three, similar, coordinate systems applicable to each format: one described by (offset,base) address pairs, another described by (horiz,vert) pixel dimension pairs and another described by (guard bit,guard_word) pairs.

Figure 11:
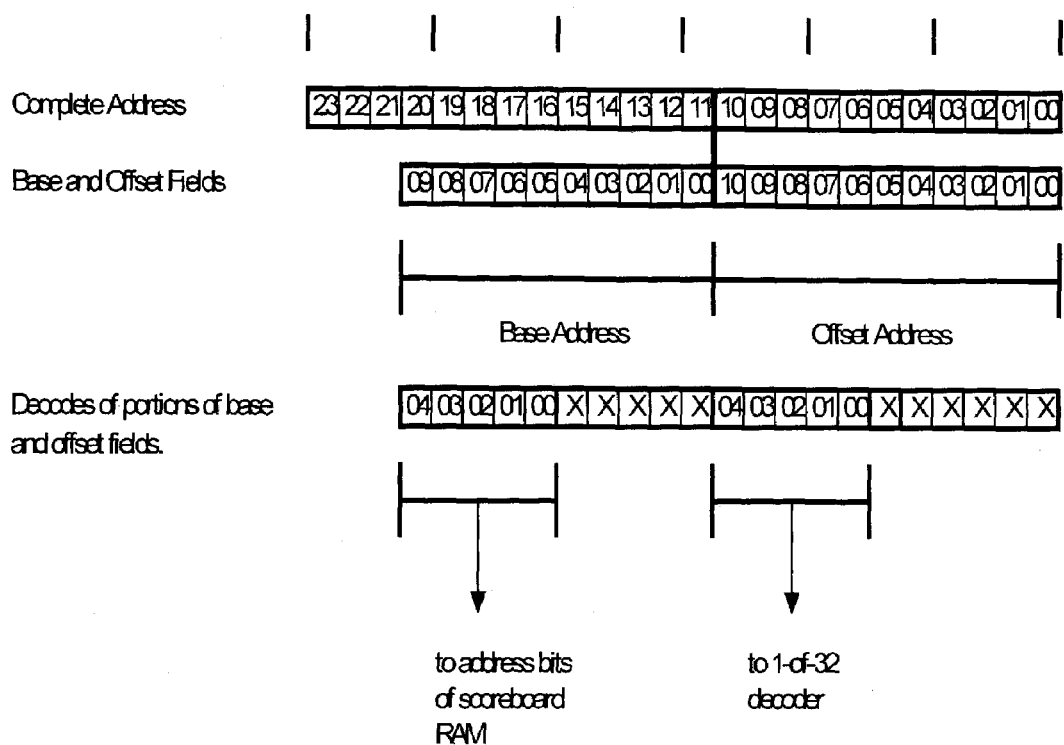
FIG. 11 is a diagram of a set of registers used in a preferred embodiment of the invention.

Again, if we refer to FIG. 8, 1024×768×16, we can split the address value into two concatenated fields as illustrated in FIG. 11.

In FIG. 11, the top row indicates the full field (bits 20 down to 00) of the physical pixel address. The following row splits this into an 11 bit Offset Address field and a 10 bit Base address field. If we take a 32 bit wide×32 location RAM and apply the upper 5 bits of Base Address to the RAM address and use the outputs of a 1-of-32 decoder to connect to the individual data bits of the RAM, we have a device which will set a bit in the RAM mapped as shown in FIG. 8. Due to the nature of the video for controlling hosts, there won't be a single bit change without multibit changes within a tile, so the use of only the upper 5 and the middle 5 bits suffices to give us an acceptable warning of any change within a tile despite the reduced resolution. Reasonable alternative sized resolution solutions are within the scope of this invention but not described because it will be easily understood by those of ordinary skill in this art.

Figure 12:
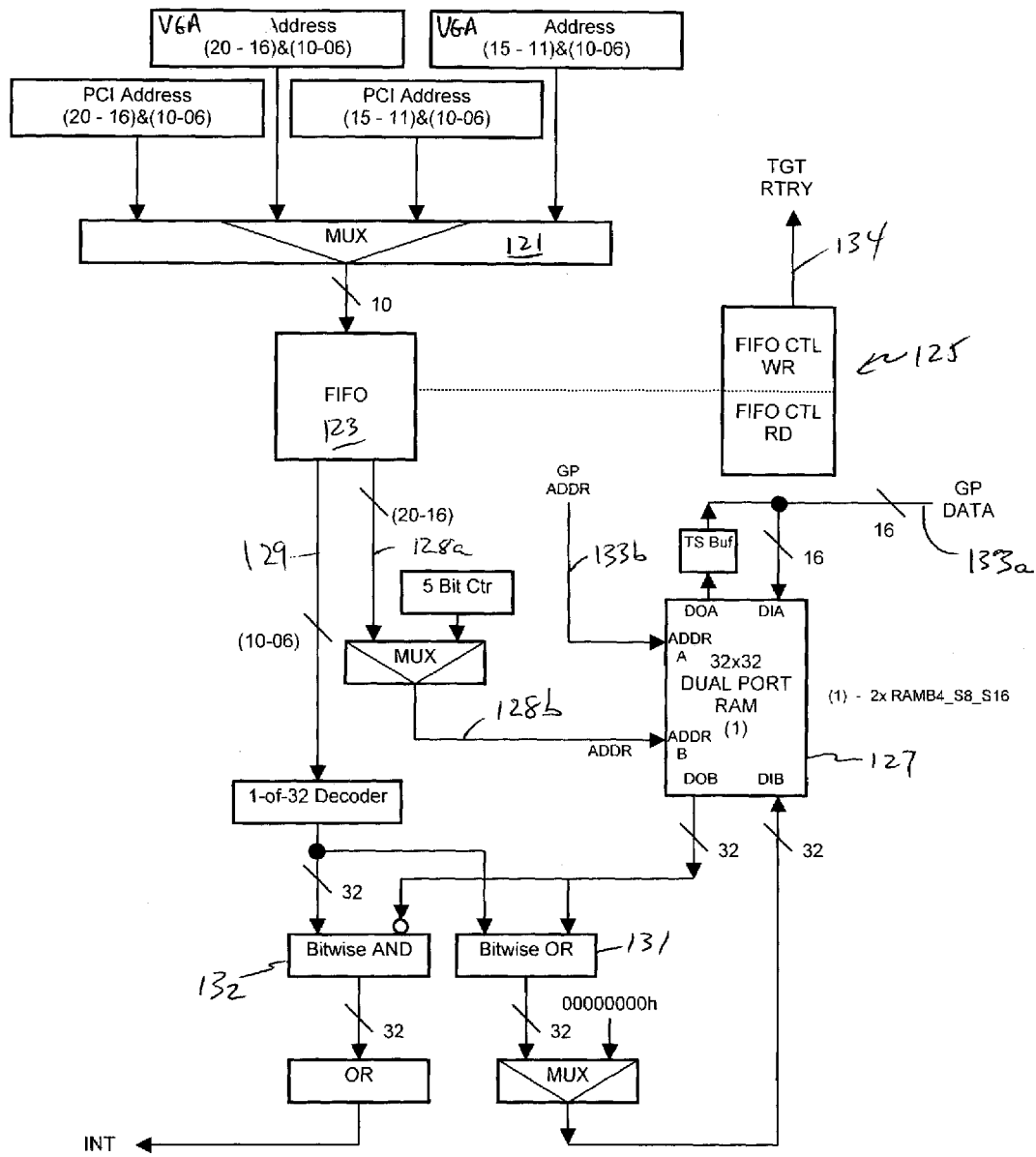
FIG. 12 is a block diagram illustrating hardware components useful for enabling register snooping for a preferred form of the video data transfer function of the invention.

FIG. 12 is a block diagram of the Frame Buffer "scoreboard" logic. MUX, 121 selects one of two sources (VGA or PCI, based on which Base Address Register is active) for the frame buffer address to be "scoreboarded". There are multiple video formats supported by the "scoreboard" logic which necessitates this selector. Referring to FIG. 11, the two, five-bit, base and offset partial fields as shown are input to the MUX 121. These five bit fields, 20 down to 16 and 10 down to 6 are concatenated into a single 10 bit value and written into one side of dual port FIFO 123. Thus the FIFO 123 continually acquires a number of values as the host writes locations in frame buffer memory. A control state machine 125 observes the status of this FIFO, and, upon detecting data in the FIFO first generates an interrupt (INT signal) and then begins a cycle of read-modify-write as follows:

The bits 20 down to 16 field is applied (128a and 128b) as an address to the hardware controlled side of a dual port SRAM 127 thus selecting one of 32 locations. Bits 10 down to 6 are applied (line 129) to a one-of-32 decoder which converts the value to a "1" on one of 32 signal lines. These 32 signals are then bitwise OR'ed 131 with the value read from the SRAM 127. This process adds a "dirty bit" to the SRAM array if one is not yet present in that bit position. The resultant value is then written back into the SRAM 127. By repeating this sequence for all values in the FIFO, the SRAM accumulates '1's in its bit positions that correspond to the associated range of "dirty" addresses in frame buffer memory.

At any time, the SC520, over the GP interface 133a and 133b, may read out the scoreboard values from the SRAM as follows:
1) Issue a command to the FIFO logic to lock out the host by issuing PCI Target Retries 134.
2) Wait for the scoreboard controller 125 to empty the FIFO 123.
3) Read out the 32×32 array from the SRAM 127.
4) Issue a clear command to the scoreboard controller 125 to clear out the SRAM by writing all '0''s (inputs from 136a and 136b cycles zeros through all the addresses).
5) Issue a command to the FIFO logic to re-enable the host (turn off target retry 134).

Figure 13:
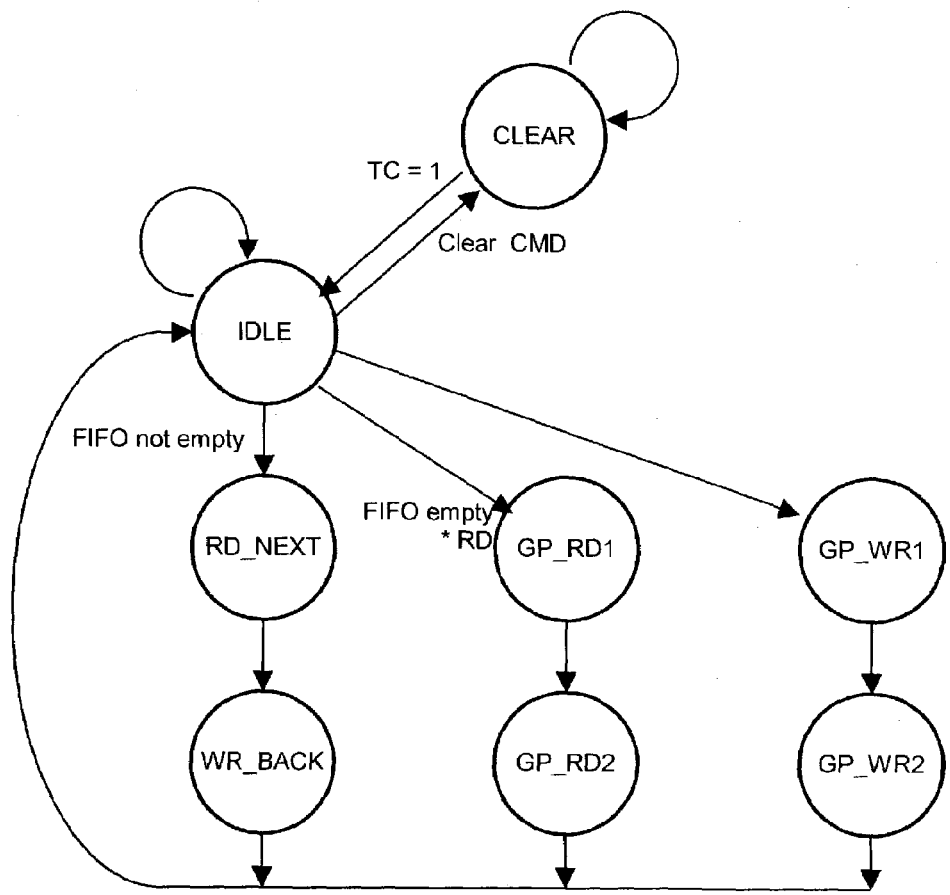
FIG. 13 is a state diagram.

FIG. 13 is a state diagram of the scoreboard controller (125 from FIG. 12) in the preferred embodiment of the invention. Referring to this figure it can be observed that there are four state sequences: one each for each of four functions.

The IDLE-RD_NEXT-WR_BACK sequence performs the previously described operation of reading out the SRAM, OR'ing "dirty bits" and writing the result back into SRAM.

The IDLE-CLEAR sequence performs the previously described operation of writing '0' throughout the SRAM.

The IDLE-GP_RD 1-GP_RD2 sequence performs the previously described operation of reading out the 32×32 array of "dirty bits".

The IDLE-GPWR$_1$-GP_WR2 sequence performs the previously described operations of disabling and enabling the host and issuing various commands including the CLEAR command.

One of ordinary skill in this art will easily implement such a state machine in the context of their system so no further detail is needed or desirable to describe the circuitry/firmware that could be used to build it.

Thus we have described a system for providing multipath emulation for console screen emulation data transfer using a universal adapter card that can operate within an environment having a non-predetermined variety of operating system environments. Specific paths provide various levels of performance and not all are useful for all operating systems. The system also provides a unique feature in that it allows for emulation of all components of a console at a remote location, including a boot data volume from which boot software can be loaded to the host system via the emulation of the data volume, appearing to the host to be local. It should be noted that where particular circuitry types are described above such as FPGA, SDRAM and the like it is recognized by those of ordinary skill in these arts that alternative circuit types can be used (ASICs and DRAMS, for example, respectively) without significant alteration of the function of the component in the context of the invention.

The invention claimed is:

1. An adapter card for a partition of a host computer system having a main memory with multipath data flow for console screen emulation wherein said multipath structure comprises:
   a memory buffer for storing frame buffer data on said adapter card said frame buffer data describing a video display of said host computer system;
   bus master interface on said adapter card interfaced to a system bus on said host computer system and target interface on said adapter card also interfaced to said system bus on said host computer system; and
   a scoreboarding circuit to store a representation of said video display of said host computer system; and whereby said bus master interface operates for transferring data between said adapter card and a portion of said host computer system main memory in one data flow mode and for operating said target interface to fill in at least one other data flow mode.

2. The adapter card of claim 1 wherein one of said other data flow modes is a VGA mode.

3. The adapter card of claim 1 wherein said scoreboardina circuit is a VGA scoreboarding circuit for storing an abbreviated representation of said video display of said host, whereby an element of said scoreboarding circuit is changed to indicate a corresponding change in a corresponding part of the host video display data.

4. The adapter card of claim 3 wherein said adapter card further comprises a memory and wherein said memory has a scoreboard indexable portion for enabling a reduced requirement for data transfer for updating an image of said video display of said host at a remote location, said adapter card further comprising logic to drive sending of only those portions of said adapter card memory indicated by said scoreboard to have been changed.

5. The adapter card of claim 4 further comprising a logic facility employing two memory structures, one of said two memory structures being a FIFO buffer for receiving each changed video address and a dual ported RAM for scoreboarding said each changed video address, wherein control of said logic facility obtains through a state machine and scoreboard controller.

6. The adapter card of claim 5 wherein said a comparison is made between each I address in said dual ported RAM and said FIFO buffer addresses to determine what parts of said video display of said host computer system has been modified.

7. The adapter card of claim 5 wherein said state machine has four state sequences: one each for each of four functions,
   a first of said four functions being an IDLE-RD_NEXT-WR_BACK sequence for reading out the dual ported RAM, OR'ing "dirty bits" and writing the result back into said dual ported RAM,
   a second of said four functions being an IDLE-CLEAR sequence for writing '0' throughout the dual ported RAM,
   a third of said four functions being an IDLE-GP_RD1-GP_RD2 sequence for reading out all said "dirty bits", from said dual ported RAM, and
   a fourth of said four functions being an IDLE-GP_WR1-GP_WR2 sequence for disabling and enabling an ability of said host to pass data to said FIFO memory, and for issuing a CLEAR command.

8. A multiprocessor host computer system having at least one partition, a one of said adapter cards as set forth in claim 1 for each partition of said host computer system.

9. The adapter card of claim 1 wherein said modes are three in number, a Legacy VGA mode employing said adapter card memory for a frame buffer and optimizing data flow by utilizing a scoreboarding circuit, and an extended video mode employing said adapter card memory for a frame buffer and optimizing data flow by utilizing a scoreboarding circuit, and an extended video mode employing said host computer system main memory as a frame buffer.

10. The adapter card of claim 9 wherein a data compression hardware circuit is included on said adapter card for reducing the amount of data transferred from said frame buffer memory in any of said three modes.

11. The adapter card of claim 10 wherein said amount of data transferred is reduced by reference to a rectangle buffer for limiting the video frame buffer data to compress in said data compression hardware circuit.

12. The adapter card of claim 10 wherein said data compression circuit is a hardware implementation of LZW-type data compression.

13. The adapter card of claim 1 wherein a data compression hardware circuit is included on said adapter card for reducing the amount of data transferred from said frame buffer memory in any of said modes.

14. The adapter card of claim 1 wherein there is more than one data flow path for emulating video display data to support a remote console, and wherein one such data flow path employs a portion of said host computer system memory for a frame buffer.

15. The adapter card of claim 14, wherein said host computer system memory frame buffer communicates with said adapter card through a bus master interface.

* * * * *

UNITED STATES PATENT AND TRADEMARK OFFICE
CERTIFICATE OF CORRECTION

PATENT NO. : 7,287,099 B1
APPLICATION NO. : 10/390983
DATED : October 23, 2007
INVENTOR(S) : Terrence V. Powderly et al.

It is certified that error appears in the above-identified patent and that said Letters Patent is hereby corrected as shown below:

In Claim 3, Column 19, Line 8 "scoreboardina" should be --scoreboarding--.

Signed and Sealed this

Twenty-seventh Day of May, 2008

JON W. DUDAS
*Director of the United States Patent and Trademark Office*